US 8,493,355 B2

(12) United States Patent
Geaghan et al.

(10) Patent No.: US 8,493,355 B2
(45) Date of Patent: Jul. 23, 2013

(54) SYSTEMS AND METHODS FOR ASSESSING LOCATIONS OF MULTIPLE TOUCH INPUTS

(75) Inventors: Bernard O. Geaghan, Salem, NH (US); Craig A. Cordeiro, Westford, MA (US)

(73) Assignee: 3M Innovative Properties Company, St. Paul, MN (US)

( * ) Notice: Subject to any disclaimer, the term of this patent is extended or adjusted under 35 U.S.C. 154(b) by 404 days.

(21) Appl. No.: 12/465,197

(22) Filed: May 13, 2009

(65) Prior Publication Data
US 2009/0284495 A1    Nov. 19, 2009

Related U.S. Application Data

(60) Provisional application No. 61/127,580, filed on May 14, 2008.

(51) Int. Cl.
*G06F 3/044*    (2006.01)

(52) U.S. Cl.
USPC ........ 345/174; 345/156; 345/173; 178/18.01; 178/18.06; 463/37; 463/38

(58) Field of Classification Search
USPC .......................... 345/173–179, 660, 156–158; 178/18.01–18.06, 18.01–18.09; 463/37–38
See application file for complete search history.

(56) References Cited

U.S. PATENT DOCUMENTS

| | | |
|---|---|---|
| 4,686,332 A | 8/1987 | Greanias et al. |
| 4,707,845 A | 11/1987 | Krein et al. |
| 4,868,912 A | 9/1989 | Doering |
| 4,914,624 A | 4/1990 | Dunthorn |
| 5,016,008 A | 5/1991 | Gruaz et al. |
| 5,119,079 A | 6/1992 | Hube et al. |
| 5,153,572 A | 10/1992 | Caldwell et al. |
| 5,231,381 A | 7/1993 | Duwaer |
| 5,241,308 A | 8/1993 | Young |

(Continued)

FOREIGN PATENT DOCUMENTS

| | | |
|---|---|---|
| EP | 0 309 946 | 4/1989 |
| EP | 0 631 256 | 12/1994 |

(Continued)

OTHER PUBLICATIONS

IntelliTouch/SecureTouch/Touch Surface Wave Touchscreens, *A Technical Comparison with Other Technologies*. ELO TouchSystems, Inc., 1999-2001 [from internet on Oct. 1, 2001], URL , <www.elotouch.com/products/inteltec/inteltecm.asp>.

(Continued)

*Primary Examiner* — Lun-Yi Lao
*Assistant Examiner* — Md Saiful A Siddiqui
(74) *Attorney, Agent, or Firm* — Robert S. Moshrefzadeh

(57) ABSTRACT

Matrix-based touch input systems assess touch locations of two or more temporally overlapping touch inputs by forming valid x-y coordinate pairs from independently determined x- and y-coordinates. Valid x-y pairs are formed based on comparing one or more signal parameters such as signal magnitude, signal strength, signal width, and signal rates of change. In matrix capacitive systems where capacitance-to-ground signals are used to determine the x- and y-coordinates, the determined coordinates may be formed into valid x-y pairs using mutual capacitance measurements. When resolving more than two temporally overlapping touches, information gained by resolving a valid x-y coordinate pair of at least one of the touches may be used to resolve the remaining touches.

29 Claims, 11 Drawing Sheets

U.S. PATENT DOCUMENTS

| | | | |
|---|---|---|---|
| 5,402,151 A | 3/1995 | Duwaer | |
| 5,484,967 A | 1/1996 | Yanagisawa et al. | |
| 5,539,427 A | 7/1996 | Bricklin et al. | |
| 5,589,856 A | 12/1996 | Stein et al. | |
| 5,757,358 A | 5/1998 | Osga | |
| 5,825,352 A * | 10/1998 | Bisset et al. | 345/173 |
| 5,854,450 A | 12/1998 | Kent | |
| 5,943,043 A | 8/1999 | Furuhata et al. | |
| 5,977,957 A | 11/1999 | Miller et al. | |
| 6,008,800 A | 12/1999 | Pryor | |
| 6,023,265 A | 2/2000 | Lee | |
| 6,067,079 A | 5/2000 | Shieh | |
| 6,163,313 A | 12/2000 | Aroyan et al. | |
| 6,208,329 B1 | 3/2001 | Ballare | |
| 6,225,985 B1 | 5/2001 | Armstrong et al. | |
| 6,236,391 B1 | 5/2001 | Kent et al. | |
| 6,239,788 B1 | 5/2001 | Nohno | |
| 6,246,395 B1 | 6/2001 | Goyins et al. | |
| 6,255,604 B1 | 7/2001 | Tokioka et al. | |
| 6,259,436 B1 | 7/2001 | Moon et al. | |
| 6,297,811 B1 | 10/2001 | Kent et al. | |
| 6,323,846 B1 | 11/2001 | Westerman et al. | |
| 6,483,498 B1 | 11/2002 | Colgan et al. | |
| 6,498,590 B1 | 12/2002 | Dietz et al. | |
| 6,590,567 B1 | 7/2003 | Nagao et al. | |
| 6,610,936 B2 | 8/2003 | Gillespie et al. | |
| 6,639,577 B2 | 10/2003 | Eberhard | |
| 6,650,319 B1 | 11/2003 | Hurst et al. | |
| 6,723,929 B2 | 4/2004 | Kent | |
| 6,738,049 B2 | 5/2004 | Kiser et al. | |
| 6,819,313 B2 | 11/2004 | Abdelhadi et al. | |
| 6,836,566 B1 | 12/2004 | Hirayama | |
| 6,856,259 B1 * | 2/2005 | Sharp | 341/5 |
| 6,977,646 B1 | 12/2005 | Hauck et al. | |
| 6,992,659 B2 | 1/2006 | Gettemy | |
| 7,030,860 B1 | 4/2006 | Hsu et al. | |
| 7,157,649 B2 | 1/2007 | Hill | |
| 7,158,123 B2 | 1/2007 | Myers et al. | |
| 7,254,775 B2 | 8/2007 | Geaghan et al. | |
| 7,746,325 B2 | 6/2010 | Roberts | |
| 2002/0050983 A1 | 5/2002 | Liu et al. | |
| 2002/0093491 A1 | 7/2002 | Gillespie et al. | |
| 2002/0149571 A1 | 10/2002 | Roberts | |
| 2003/0063073 A1 * | 4/2003 | Geaghan et al. | 345/173 |
| 2003/0206162 A1 | 11/2003 | Roberts | |
| 2004/0001048 A1 | 1/2004 | Kraus et al. | |
| 2004/0217945 A1 | 11/2004 | Miyamoto et al. | |
| 2005/0052432 A1 * | 3/2005 | Kraus et al. | 345/173 |
| 2006/0022956 A1 | 2/2006 | Lengeling et al. | |
| 2006/0097991 A1 | 5/2006 | Hotelling et al. | |
| 2006/0139340 A1 | 6/2006 | Geaghan | |
| 2006/0238521 A1 | 10/2006 | Westerman et al. | |
| 2006/0267953 A1 | 11/2006 | Peterson, Jr. | |
| 2006/0279548 A1 * | 12/2006 | Geaghan | 345/173 |
| 2006/0288313 A1 * | 12/2006 | Hillis | 715/863 |
| 2007/0139395 A1 | 6/2007 | Westerman et al. | |
| 2007/0236478 A1 * | 10/2007 | Geaghan et al. | 345/173 |
| 2007/0268269 A1 | 11/2007 | Chang et al. | |
| 2007/0268273 A1 | 11/2007 | Westerman et al. | |
| 2008/0062140 A1 * | 3/2008 | Hotelling et al. | 345/173 |
| 2009/0051671 A1 * | 2/2009 | Konstas | 345/174 |

FOREIGN PATENT DOCUMENTS

| | | |
|---|---|---|
| JP | 01-099121 | 4/1989 |
| JP | 01-269120 | 10/1989 |
| JP | 08-083144 | 3/1996 |
| JP | 08-190453 | 7/1996 |
| JP | 08-241161 | 9/1996 |
| JP | 09-292952 | 11/1997 |
| JP | 09-325851 | 12/1997 |
| JP | 2000-010733 | 1/2000 |
| JP | 2000-172441 | 6/2000 |
| WO | WO 97/18547 | 5/1997 |
| WO | WO 97/30416 | 8/1997 |
| WO | WO 99/19855 | 4/1999 |
| WO | WO 99/40562 | 8/1999 |
| WO | WO 01/41115 | 6/2001 |
| WO | WO 2008/007372 | 1/2008 |

OTHER PUBLICATIONS iTouch Surface Wave Technology, *"Touch-on-Tube" Technology-A Breakthrough for Gaming and Amusement Machines*, ELO TouchSystems, Inc., Sep. 2001.

PCT International Search Report, PCT/US2009/043731, International Filing Date May 13, 2009, Form PCT/ISA/210—5 pages.

* cited by examiner

SYSTEMS AND METHODS FOR ASSESSING LOCATIONS OF MULTIPLE TOUCH INPUTS

CROSS REFERENCE TO RELATED APPLICATION

This patent document claims the benefit, under 35 U.S.C. §119(e), of U.S. Provisional Patent Application Ser. No. 61/127,580 filed on May 14, 2008, entitled "Systems and Methods for Assessing Locations of Multiple Touch Inputs" the disclosure of which is incorporated by reference in its entirety.

FIELD OF THE INVENTION

The present invention relates generally to touch input systems and methods for assessing and discriminating multiple touch inputs, and in particular to discriminating multiple touch inputs in touch systems susceptible to phantom touch errors.

BACKGROUND

Touch sensitive devices allow a user to conveniently interface with electronic systems and displays by reducing or eliminating the need for mechanical buttons, keypads, keyboards, and pointing devices. For example, a user can carry out a complicated sequence of instructions by simply touching an on-display touch screen at a location identified by an icon. In many touch sensitive devices, the input is sensed when a conductive object in the sensor is capacitively coupled to a conductive touch implement such as a user's finger. Such devices measure capacitance at multiple locations due to the touch disturbance, and use the measured capacitances to determine touch position.

In some applications, multiple touch inputs are applied at the same time, for example from multiple users in a multi-player game or from a single person using a virtual keyboard or similar interface. Such applications benefit from the accurate discrimination of multiple simultaneous touches so that the touch position for each input can be determined to trigger appropriate actions in the application.

SUMMARY OF THE INVENTION

In certain embodiments, the present invention provides methods for assessing and discriminating touch locations of two or more temporally overlapping touch inputs for use with matrix capacitive touch screen systems. Such systems include a sensor having a plurality of x-electrodes for providing x-signals based on capacitance-to-ground measurements and indicative of x-coordinates of touch inputs, and a plurality of y-electrodes for providing y-signals based on capacitance-to-ground measurements and indicative of y-coordinates of touch inputs. Such methods include determining valid x-coordinates of the two or more touch inputs from received x-signals, determining valid y-coordinates of the two or more touch inputs from received y-signals, and forming valid x-y coordinate pairs, the valid x-y pairs being indicative of the locations of the touch inputs. In certain embodiments, forming valid coordinate pairs may be performed using mutual capacitance measurements, and/or by comparing one or more signal parameters such as signal magnitude, signal strength, signal width, and signal rates of change.

In certain embodiments, the present invention provides matrix capacitive touch screen systems that include a sensor having a plurality of x-electrodes for providing x-signals based on capacitance-to-ground measurements and indicative of x-coordinates of touch input locations, and a plurality of y-electrodes for providing y-signals based on capacitance-to-ground measurements and indicative of y-coordinates of touch input locations. Such systems further include controller circuitry coupled to the x-electrodes to receive the x-signals and coupled to the y-electrodes to receive the y-signals, the controller configured to determine one or more x-coordinates from the x-signals and one or more y-coordinates from the y-signals, and responsive to two or more touch inputs applied to the touch sensor to form valid x-y coordinate pairs from the determined x-coordinates and determined y-coordinates.

In certain embodiments, the present invention provides methods for assessing touch locations of three or more temporally overlapping touch inputs for use in matrix touch screen systems that includes a sensor providing x-signals indicative of x-coordinates of touch inputs and y-signals indicative of y-coordinates of touch inputs. Such methods include determining valid x-coordinates of the three or more touch inputs from received x-signals, determining valid y-coordinates of the three or more touch inputs from received y-signals, forming a valid x-y pair from the determined x-coordinates and the determined y-coordinates indicative of a valid touch location, thereby resolving one of the touch inputs with the other touch inputs remaining unresolved, and responsive to the resolved touch input, forming valid x-y pairs for one or more of the unresolved touch inputs from the remaining x-coordinates and remaining y-coordinates.

In certain embodiments, this disclosure is also directed to, for use in a matrix touch screen having a plurality of nodes at the intersections of x- and y-sensor bars, each node being driven by electronics such that it yields a signal strength, a method for assessing touch locations of two or more temporally overlapping touch inputs comprising, for nodes having signal strength above a defined touch-event threshold: (1) associating the node having the highest signal strength with a first touch; (2) associating nodes adjacent the node with the highest signal strength with the first touch; (3) among nodes not associated with the first touch, associating the node having the highest signal strength with a second touch; and (4) associating nodes adjacent to the node associated with the second touch with the second touch.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

The present disclosure may be more completely understood and appreciated in consideration of the following detailed description of various embodiments in connection with the accompanying drawings, in which.

Figure 1:
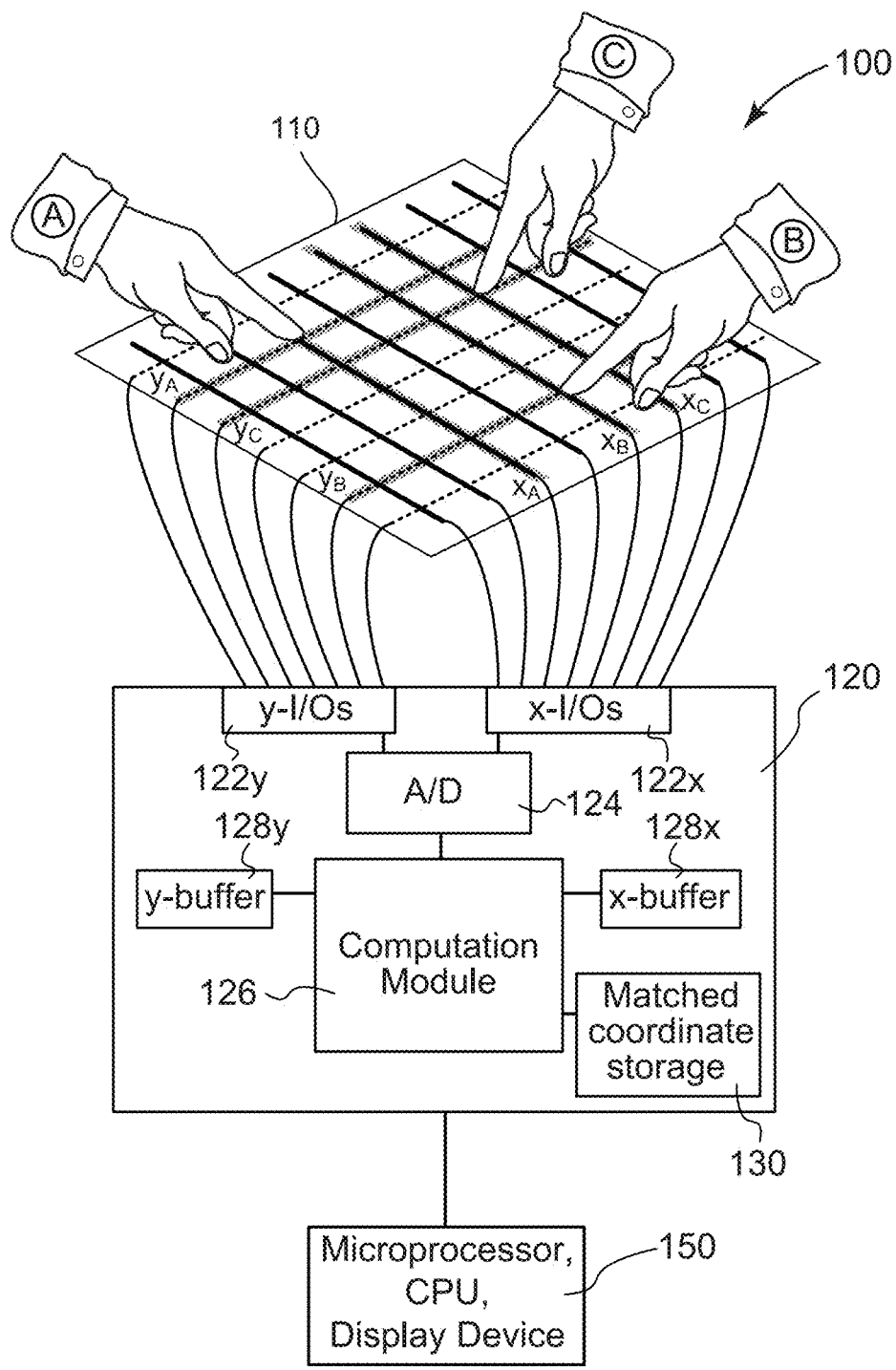
FIG. 1 schematically illustrates a matrix touch sensor system for assessing multiple touch inputs in accordance with certain embodiments of the present invention.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

The present invention is generally applicable to touch systems and particularly to touch systems where two or more touches may be applied by one or more users. The present invention is particularly suited to a touch system where some portion of two or more touch inputs may occur simultaneously or otherwise temporally overlap. For example, the present invention may be suited for use in an electronic game system designed to be played by one or more players where, in the course of playing the game, players can apply touch input to generate a response in the game, and where two or more touches may start at the same time and/or end at the same time and/or overlap for at least part of the time during which each touch is applied. Such touch inputs can be referred to as overlapping touches, double touches, or simultaneous touches.

In certain embodiments, the present disclosure is directed to touch sensor systems and methods for assessing touch locations of two or more temporally overlapping touch inputs. For example, such systems and methods include a sensor having a plurality of x-electrodes for providing x-signals based on capacitance-to-ground measurements and indicative of x-coordinates of touch inputs, and a plurality of y-electrodes for providing y-signals based on capacitance-to-ground measurements and indicative of y-coordinates of touch inputs. Valid x-coordinates of the two or more touch inputs are determined from received x-signals, and valid y-coordinates of the two or more touch inputs are determined from received y-signals. Valid x-y pairs are formed from the determined x- and y-coordinates, the valid pairs being indicative of valid touch locations. The x-y coordinate validation may be performed, for example, using mutual capacitance measurements, and/or by comparing one or more signal parameters such as signal magnitude, signal strength, signal width, and signal rates of change. Co-assigned U.S. Pat. No. 7,254,775, "Touch Panel System and Method for Distinguishing Multiple Touch Inputs" (Geaghan, et. al.) includes methods and systems for distinguishing multiple temporally overlapping touch inputs, and is hereby incorporated by reference in its entirety.

Touch panel sensors, controllers, systems and methods are disclosed that can distinguish temporally overlapping touch inputs from single touch inputs so that valid touch position coordinates can be determined. Touch panel systems and methods of the present invention can distinguish overlapping touches by comparing signal strengths to specified thresholds, by comparing sequential changes of signal magnitudes by comparing the rates of change of signal magnitudes or measured positions to determined parameters, and the like. As used in this document, signal magnitude is a measure that includes signal strength and signal width.

The present invention provides systems and methods for discriminating valid touch locations among multiple possible touch locations resulting when two or more touches temporally overlap. Further, the present invention provides for storing the signals measured during multiple touch overlap so that the information gained by discriminating and reporting a least one valid touch location may be used to identify, discriminate, and report additional valid touch locations from the stored signals.

By the nature of the detection mechanisms, matrix touch sensor technologies such as matrix capacitive, infrared matrix (IR), and surface acoustic wave (SAW), can readily indicate and distinguish valid x-coordinates and valid y-coordinates of multiple touch events. However, it may not be apparent which x-coordinate goes with which y-coordinate, and as such the present invention involves distinguishing the valid touch locations (that is, valid x-y matches) from the phantom touch locations (that is, invalid x-y matches). This can be done by comparing and correlating timing of signal event sequences, correlating signal magnitude information, correlating signal rate of change information, and so forth. The basic principle of discrimination is that the x- and y-signals for a valid touch location point will have similar signal timings, signal strengths, signal magnitudes, and signal rates of change, whereas phantom touch points will be associated with x- and y-signals that differ in some or all of these signal characteristics. As such, any of these signal characteristics may be used individually or in any suitable combination to distinguish valid touch locations from phantom touch locations.

In certain embodiments, the presence of multiple touch points is distinguished from the presence of single touches prior to discriminating multiple real touch points from phantoms. When two touches are spatially very close to one another, their signals may blend together so that discriminating two from one is not immediately apparent. Later portions of this disclosure describe methods for resolving such proximate multiple touches in a matrix capacitive system based on touch signal magnitudes as well as describes calibration techniques for interpolation based on scaled measurements to achieve improved touch location accuracy, and may be used with the methods described herein for enhanced resolution.

In certain embodiments, multiple touches are sufficiently resolved by determining valid x- and y-coordinates, even if the valid coordinates are not matched to form valid coordinate pairs. In such embodiments, the bounding polygon defined by the possible touch points is of interest. For example, two touches along with their phantoms may define the vertices of a bounding box oriented with touch coordinate system. The bounding box may be used as a reference to scale a displayed rectangle smaller and larger by detecting movement of the two touches closer and further apart. Applications include a pinch zoom operation, which need not rely on discriminating real touches from phantom touches. Methods that may be used in performing such operations are described below.

As more temporally overlapping touches are applied, for example 3 or more touches, the likelihood increases that a touch will land at or near one of the phantom touch locations. In accordance with certain embodiments of the present invention, such circumstances may be addressed by correlating one or more signal characteristics to find at least one valid touch location, and using the valid touch location to eliminate one or more of the possible phantom touch locations, thereby simplifying analysis of the remaining signals.

In certain embodiments involving matrix capacitive touch sensors, capacitance-to-ground signals are used to develop a set of valid x- and y-coordinates, which represent a set of possible x-y touch locations. Each of the possible x-y touch locations may then be tested for existence of a mutual capacitance between the x- and y-electrodes, indicating the existence of a valid touch location. For example, given a 3-touch situation, there exist 3 possible x-coordinates, x1, x2 and x2, and 3 possible y-coordinates, y1, y2 and y3, giving rise to 9 possible touch locations: (x1,y1), (x1,y2), (x1,y3), (x2,y1), (x2,y2), (x2,y3), (x3,y1), (x3,y2), and (x3,y3). Assuming the x-electrodes are drive lines and y-electrodes are sense lines, each of the x-electrodes associated with a valid x-coordinate may be driven in turn, and each of the y-electrodes associated with a valid y-coordinate may be monitored for a mutual capacitance signal. Such a process reveals the valid x-y pairings. Additionally, touch locations may be refined by interpolations techniques, for example by monitoring for signal strength (capacitance-to-ground or mutual capacitance) on the x- and y-electrodes on either side of the valid touch location, and adjusting the touch location accordingly. Appendices A and C describe such techniques.

Because touch panel systems and methods of the present invention can discriminate multiple touches, they can be used in multiple user applications such as multiplayer games, in applications that may be subject to rapidly successive or overlapping touch inputs, and in applications where a single user uses multiple fingers (in any combination from one or two hands) to input information such as gestures or virtual keyboard touches. The ability to discriminate among any arbitrary number of simultaneous touches allows the development of applications that take advantage of such functionality. For example, certain handheld devices utilize a touch input pinch zoom and expand operations where a user touches the screen with two fingers, and expands or contracts the separation between them to zoom in or out of a document, map, image, etc.

Systems and methods of the present invention may also be used to detect and discriminate hover events from simultaneous touch or hover events. Hover events occur when a touch object is brought close enough to the touch surface to capacitively couple with the electrodes while not being sufficiently close to the touch surface to be considered a full touch, for example, being in contact with the touch surface, or being in contact with sufficient pressure. When touches and touch inputs are referred to in this document, it should be considered that both full touches and hover events are included, unless the context dictates otherwise.

In a touch screen system, the location of a touch applied by a user is generally determined by measuring signals generated by the touch input, and using the signals to calculate the position of the touch. Application-dependent instructions are then carried out based on the determined touch position. Assuming a properly calibrated touch system, the calculated touch position should be sufficiently close to the actual location touched by the user so that the user's intended instruction can be carried out. How close the reported touch location should be to the actual touch location to be sufficiently close is determined, in part, by the resolution of the touch system. A reported touch location that sufficiently closely corresponds to an actual location touched by a user is referred to as a valid touch. As used in this document, reporting a touch location refers to the calculated touch location being used by the touch system in an appropriate manner, for example by the application software to determine the user input instructions. Reporting might include communications from a touch screen controller to a central processing unit, or in a more integrated system can simply entail touch position data being calculated and appropriately used as contemplated by the application.

Methods of the present invention may be suited for use with various different touch sensor technologies in which x-coordinate data may be determined independent from y-coordinate data, for example matrix capacitive (capacitance-to-ground) systems, matrix IR, and SAW. Because each touch screen technology differs at least somewhat in the touch input signals that are measured, and in the manner that the signals are interpreted, the implementation of aspects of the present invention can have application-specific elements.

In certain embodiments, the present invention is used to distinguish among multiple temporally overlapping touch inputs, in particular when a matrix capacitive touch sensor is used as the touch input device. When capacitance-to-ground signals are used to determine touch coordinates in matrix capacitive touch sensor systems, the capacitance-to-ground signal for each individual electrode is measured. As such, valid x-coordinate positions may be directly determined from signals gathered from the x-electrodes, and valid y-coordinate positions may be directly determined from signals gathered from the y-electrodes. In circumstances where a single touch input is applied to the sensor so that a single x-coordinate and a single y-coordinate are validated, no coordinate discrepancies exist, and the touch location may be directly reported (even though the touch location may be refined through interpolation and other methods that may use additional information gathered from additional signals, such as ratiometric current measurements, mutual capacitance measurements, and so forth, as will be understood to those skilled in the art). In circumstances where multiple touch inputs are applied to the sensor so that the touch inputs overlap in time, there generally exists a valid pairing of x-coordinates and y-coordinates for each touch input (valid touch locations), as well as invalid pairings (phantom touch locations). Aspects of the present invention are drawn to discriminating valid touch locations from phantom touch locations using various techniques to identify valid coordinate pairings for any arbitrary number of temporally overlapping touches on a sensor that provides x- and y-coordinate information independently.

The present Applicant has recognized efficiencies that result from distinguishing multiple touches on a matrix capacitive touch sensor by using capacitance-to-ground measurements. In making capacitance-to-ground measurements using a matrix capacitive touch sensor, signals produced by each x-electrode and each y-electrode are measured to independently determine the x-position and y-position of touch inputs. As discussed above, such independent determination can result in phantom touches when multiple touches are applied during the same time frame. Matrix capacitive touch sensors can also be measured by monitoring mutual capacitance between each x-electrode and each y-electrode. In this way, each x-y electrode intersection is monitored, automatically resolving valid touches (that is, phantom touches do not arise). However, for a sensor that includes N x-electrodes and M y-electrodes, mutual capacitance involves making N×M measurements for full characterization of the sensor, whereas capacitance-to-ground involves making N+M measurements. Moreover, capacitance-to-ground measurements may be made on all X or Y electrodes simultaneously, so all electrodes may be measured in two steps, whereas mutual capacitance involves driving each electrode of one dimension sequentially, and measuring electrodes or the other dimension either simultaneously or sequentially.

FIG. 1 schematically illustrates a touch sensor system 100 in which x-coordinate data and y-coordinate data are independently measured and then matched, or correlated, to form valid x-y pairs that represent touch positions on the sensor 110. For ease of illustration, touch sensor 110 will be described as a matrix capacitive touch sensor, although it will be appreciated that sensor 110 and the concepts described herein are equally applicable to IR, SAW, and other matrix-based touch sensing technologies. Touch sensor system 100 may be incorporated into any suitable device, including mobile devices such as tablet computers, PDAs, cell phones, and so forth, as well as gaming and entertainment machines, public kiosks, or any other device that utilizes touch input and may include applications that utilize multiple touch locations that may be applied at the same time from a single user or from multiple users. Many of these concepts described herein are suited for analogous implementation in a variety of suitable ways for matrix systems that measure X and Y independently, including matrix capacitive touch systems, IR touch systems, and SAW touch systems.

Matrix capacitive touch screens include a grid of multiple electrodes so that when a touch object is capacitively coupled to electrodes in close proximity to the touch location, the resulting signals can be measured to determine the touch location. Multiple electrode sensor arrangements include mutually orthogonal sets of linear x-electrodes and linear y-electrodes, although other arrangements are possible. Signals may be based on capacitance-to-ground measurements where the effect of a touch on each individual electrode is measured, or based on mutual capacitance measurements where the effect of a touch on each electrode pair is determined by driving one electrode of the pair and sensing the other. In exemplary matrix capacitive touch screens, individual electrodes are activated, for example sequentially, with an AC signal. A finger or other conductive touch object that is in sufficient proximity with one or more of the electrodes capacitively couples to them and alters the signal on the electrode in proportion to the strength of the capacitive coupling. This signal change is measured on each electrode, and the relative changes are used to calculate touch position.

Figure 7:
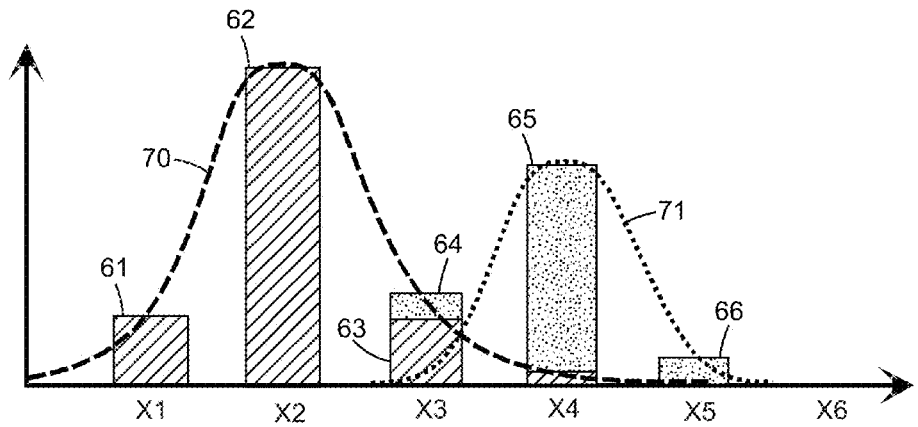
FIG. 7 illustrates signals received at neighboring electrodes in a matrix capacitive touch system in the presence of two proximately located touches that are resolvable in accordance with certain embodiments of the present invention.

Touch position is a function of signal strength and signal width. Signal strength is the maximum signal measured on one capacitive electrode, for example, item 62 shown in FIG. 7. Signal width is the width of the bell shaped signal envelope measured across several capacitive electrodes, for example, the width of curve 70 as shown in FIG. 7. Capacitive signal magnitude may include signal strength and/or width.

The operating principles of matrix IR touch screens are disclosed, for example, in U.S. Pat. No. 4,868,912. Matrix IR touch systems typically have arrays of light emitters (for example LED's) on two adjacent edges (horizontal and vertical) of a rectangular active touch surface, and arrays of light receivers on the two opposite edges of the active surface. In its simplest form, each emitter sends light to a receiver directly opposite from it, across the active surface. A touch on the active surface breaks at least one horizontal light bean and one vertical beam. Location of a touch is determined by which light receivers have a reduction in received light. Signal magnitude in an IR system refers to the width of a shadow caused by a touch interrupting IR light beams.

The operating principles of SAW touch screens are disclosed, for example, in U.S. Pat. No. 6,225,985. In SAW systems, acoustic waves are launched from a transmitter, then distributed across the active surface of the touch screen by a reflecting array near one edge of the active surface, then reflected to receiver by a reflecting array on the opposite edge of the active surface. For example, waves are launched horizontally by a transmitter at a reflecting array above the active surface until the wave energy is reflected 90° and distributed evenly across the active surface by a reflecting array. The waves are then reflected horizontally to a receiver by a reflecting array below the active surface. The relative times that the wave energy arrives at the receiver depends on the (horizontal) distance the energy traveled in the reflecting arrays. Thus the time of wave travel correlates to horizontal position on the active surface. A touch on the active surface absorbs some of the energy of waves that travel under the touch, attenuating a portion of the received wave. The touch can then be located in the horizontal (X) dimension by measuring the relative time the attenuated portion of the wave was received. Magnitude of a touch may include the maximum degree of attenuation and the width of an attenuated portion of a received wave. Vertical waves can be launched, distributed, and detected in an analogous manner to measure the vertical (Y) coordinate of a touch.

Referring again to FIG. 1, sensor 110 includes x-electrodes (for example, including electrodes $x_A$, $x_B$, and $x_C$) connected to x-I/Os (input/outputs) 122x of controller 120, and y-electrodes (for example, including electrodes $y_A$, $y_B$, and $y_C$) connected to y-I/Os 122y of controller 120. In response to touch inputs, for example inputs from touches A, B, and C, signals are generated in one or more x- and y-electrodes, which may be converted by A/D converter 124 for touch position computation. In certain embodiments, capacitance-to-ground measurements are made by using a signal to drive each electrode (simultaneously, or in sequence, in accordance with a dynamic addressing scheme, in random order, etc.) with the driven electrode(s) being measured. In certain embodiments, mutual capacitance measurements are made at the intersection of a pair of x- and y-electrodes by driving one of the electrodes in the pair (referred to as the drive electrode or drive line), and measuring the signal due to coupling to the other electrode in the pair (referred to as the sense electrode or sense line). Mutual capacitance may also be measured by driving one x-electrode and measuring all y-electrodes at once, for example.

From the received and converted x- and y-signals, a computation module 126 is used to calculate one or more valid x-coordinates, which may be stored in x-buffer 128x, and one or more valid y-coordinates, which may be stored in y-buffer 128y. The various possible combinations of valid x- and y-coordinates represent a set of possible touch locations that include real touches and phantom touches. The computation module 126 discriminates real touches from phantom touches by correlating features of the received x-signals to features of the received y-signals. As valid x-y coordinate pairs are formed, they may be stored 130 for delayed reporting and for use in further discriminating steps. For example, once a valid touch is determined, it can be "locked in" and discriminated from other touches even as the determined touch is moved across the touch surface. Resolved touches (and in certain applications unresolved touches) may be reported to another device 150 for further analysis, for use in an application, for display, and so forth.

Figure 2:
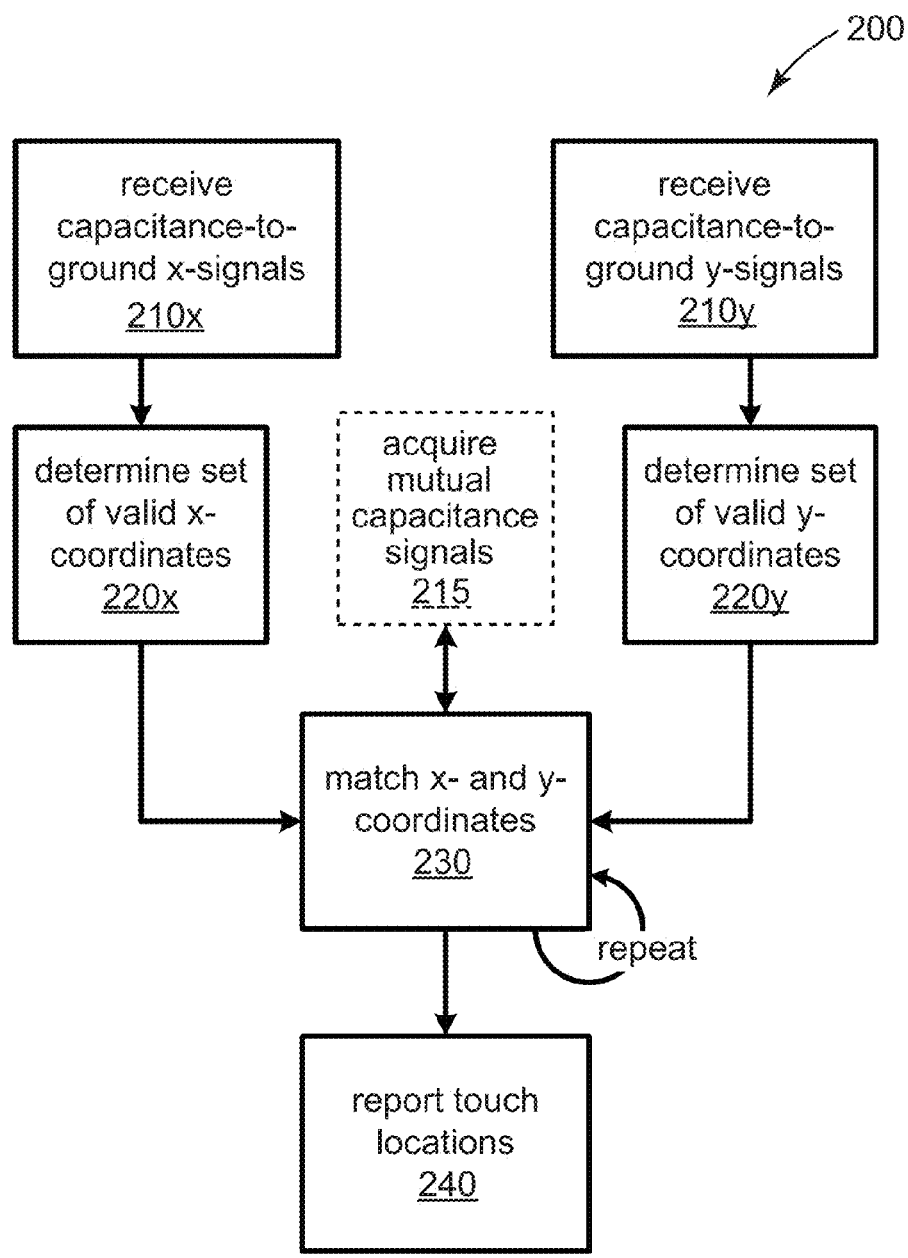
FIG. 2 illustrates steps used in assessing multiple touch inputs in accordance with certain embodiments of the present invention.

FIG. 2 schematically illustrates a touch discrimination process 200 that may be implemented in a touch controller, and that is applicable to matrix capacitive touch sensors in accordance with certain embodiments. Capacitance-to-ground x-signals are received 210x, as are capacitance-to-ground y-signals 210y. From the received x-signals, a set of valid x-coordinates is determined 220x. Likewise, from the received y-signals, a set of valid y-coordinates is determined 220y. The determined x- and y-coordinates are then matched 230 to form valid coordinate pairs. In certain embodiments, the matching of coordinate pairs is performed using mutual capacitance signals, which are optionally acquired 215 at or near potential touch location points as determined by possible x- and y-coordinate matchings. As x- and y-coordinates are matched, this information is available for use in further matching operations. Valid touch positions are then appropriately reported 240.

In addition to mutual capacitance measurements, matching operations include correlating signal timing sequences, correlating signal strengths, correlating signal magnitudes, correlating signal widths (particularly useful in SAW and IR touch sensors), correlating signal rates of change (for example, rates of rise or fall of signal magnitude), and observing continuity of touch location movement across touch sensor (that is, once the coordinates of a real touch are established, the continuity of the touch can be tracked as touch position moves across a touch screen and used to discriminate subsequent touches from phantoms).

Generally, a touch applied to a touch screen can be thought of as a time sequence of event that may include, for example, an approaching or hovering touch object, a touch-down of a touch object on the touch surface, a hold or dwell time of the touch, a drag motion where the touch object is moved across the touch surface (or moved around while maintained at a detectable hover distance), and a lift-off of the touch object from the touch surface. In accordance with certain embodiments, one or more of such events may be observed in x-signals and y-signals, and their relative timings are correlated to match-up valid x- and y-coordinate pairs.

A touch-down is generally determined by a signal magnitude rising above threshold value, which can be a set value or a dynamically determined value (for example, based on environment, background noise, and differences between degrees of capacitive coupling of different touch objects). At some signal value below the touch threshold level, a measurable signal may be obtained even though contact with the touch surface has not been made. This is known as a hover event, which may also have an associated threshold signal level. The locations of hovers may be determined in a manner similar to full touch events, although the system may require that additional factors be satisfied first (for example, hover detected for a certain amount of time to distinguish from spurious or accidental encounters, hover confined to a small area to distinguish a finger from a whole hand, and so forth). Even if hover locations are not reported, hover information may be recorded and used with touch-down data to discriminate real from phantom touches.

FIGS. 3A, 3B through 5A, 5B illustrate discrimination of real and phantom touches in various 3-touch scenarios on a matrix capacitive touch sensor that includes x-electrodes X1-X8 and y-electrodes Y1-Y7. In each case, three real touches are presented, labeled A, B, and C, and the resulting set of phantom touches (unlabeled) are indicated.

Figure 3A:
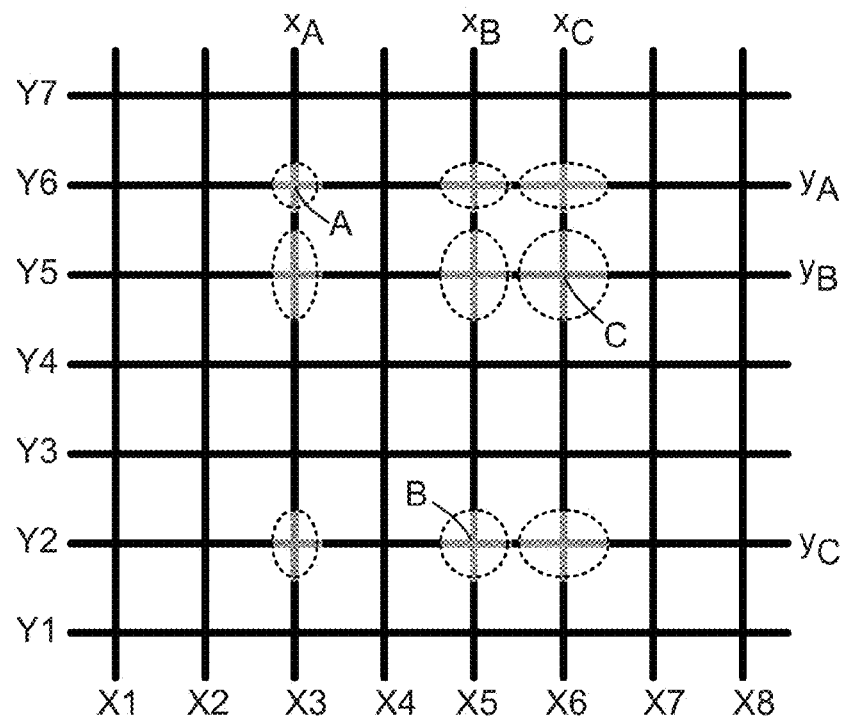
FIG. 3A illustrates three temporally overlapping touches on a matrix touch sensor that are resolvable in accordance with certain embodiments of the present invention.
Figure 3B:
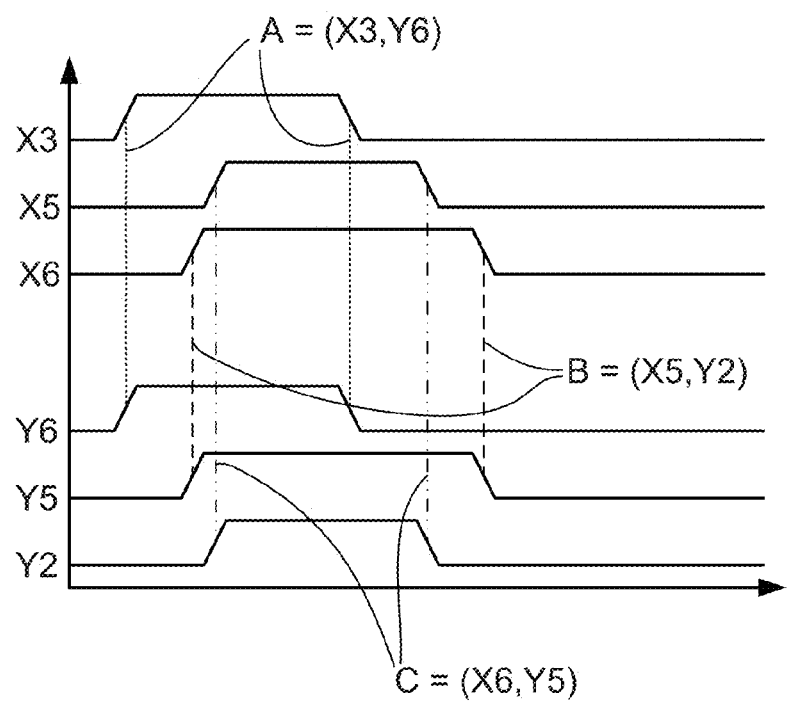
FIG. 3B schematically illustrates time plots of signals received for the touches indicated in FIG. 3A.

In FIG. 3A, an example of the most general case is shown in which each of the three real touches, A, B, and C, have distinct x-coordinates and distinct y-coordinates. The strongest received signals (that is, on the electrodes nearest to the touches), are schematically illustrated in FIG. 3B. In this scenario, each of the touches is applied and removed at different times, although they all overlap for some duration. (It is possible, though unusual, that two points may be touched simultaneously in such a manner that the touches cannot be discriminated by signal timing sequences, in which case other parameters may be used, as described herein.) The touches may be discriminated by correlating the timing of each x-signal rise with each y-signal rise and/or by correlating the time of each x-signal fall with each y-signal fall, resulting the in the resolved touch locations for A=(X3,Y6), B=(X5,Y2), and C=(X6,Y5).

Other parameters may also be used, for example when one or more of the signals rise or fall together in time such that timing sequence does not properly discriminate the touches. The use of other parameters such as signal strength and signal width is visually represented in FIG. 3A by showing each touch A, B, and C as a circle of different diameter. Assuming that an individual touch will have x-characteristics that are similar to y-characteristics, the real touches will be those whose parameters are most symmetric. As such, in FIG. 3A, the phantom touches are shown as elliptical shapes having an x-dimension equal to the diameter of the real touch contributing the x-signal and a y-dimension equal to the diameter of the real touch contributing the y-signal. The x-y asymmetry is indicative of a phantom touch.

Figure 4A:
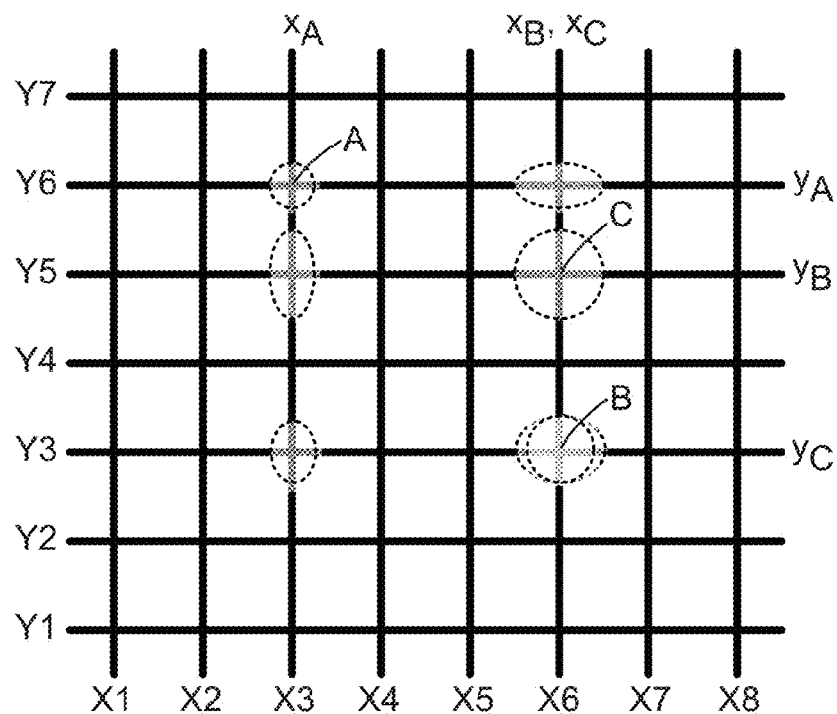
FIG. 4A illustrates three temporally overlapping touches on a matrix touch sensor that are resolvable in accordance with certain embodiments of the present invention.
Figure 4B:
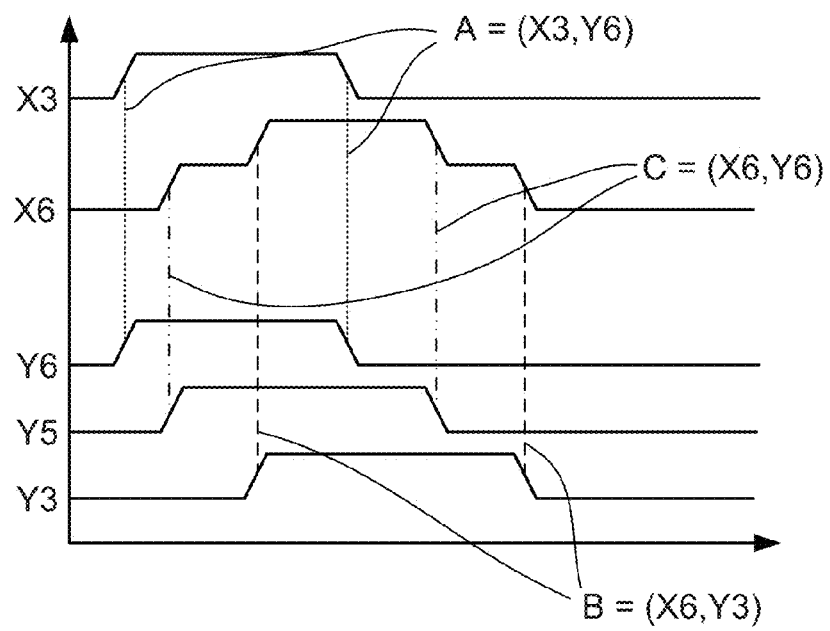
FIG. 4B schematically illustrates time plots of signals received for the touches indicated in FIG. 4A.

In FIG. 4A, an example is shown in which two of the three real touches, B and C, have the same x-coordinate, and all the real touches have distinct y-coordinates. In this case, the timing of signal changes as shown in FIG. 4B may still be used to differentiate among the touches. On capacitive and SAW systems it may be possible to detect that the change in signal strength on electrode X6, simultaneous with a new signal on Y3 is indicative of two touches, whereas the peak signal strength on electrode X3 is indicative of a single touch. As such, once the touch location of touch A is resolved (X3,Y6), the x-coordinate of touches B and C may be directly determined, thereby resolving the positions B=(X6,Y3) and C=(X6,Y5).

Signal width may also be used to discriminate phantom touch situations described with reference to FIGS. 4A, 4B, 5A, and 5B. For example, in FIGS. 4A and 5A, the signal of touch C is wider than signal A. Change in signal width may indicate two touches in the same way as signal strength. For example, measured horizontal width of the touch centered on electrode X6 does not change when wider touches B and C are added, indicating that phantoms at (X3,Y3) and (X3,Y5) are not real touches.

Figure 5A:
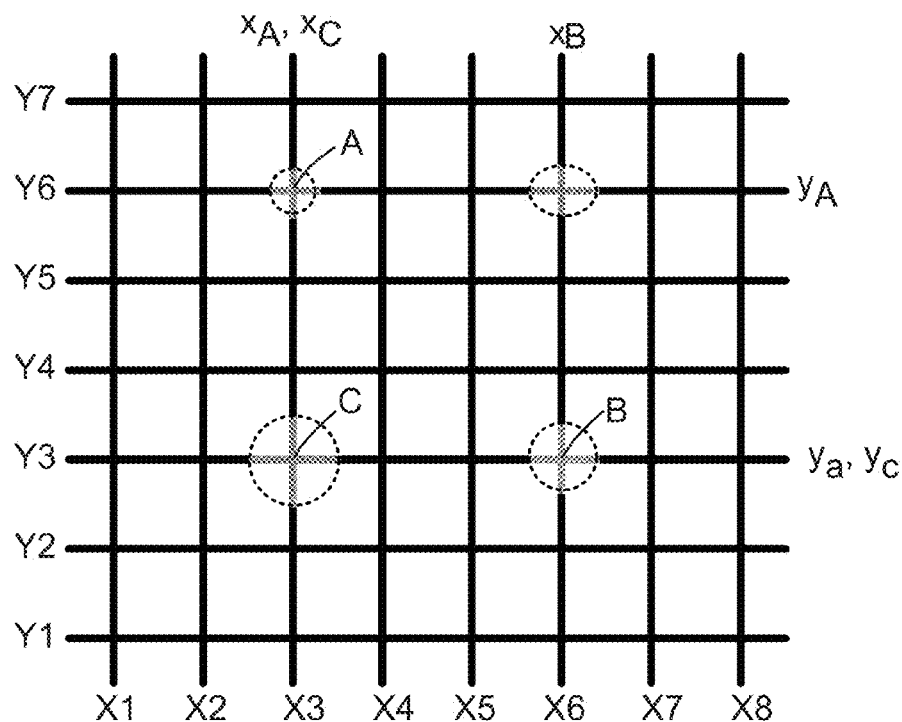
FIG. 5A illustrates three temporally overlapping touches on a matrix touch sensor that are resolvable in accordance with certain embodiments of the present invention.
Figure 5B:
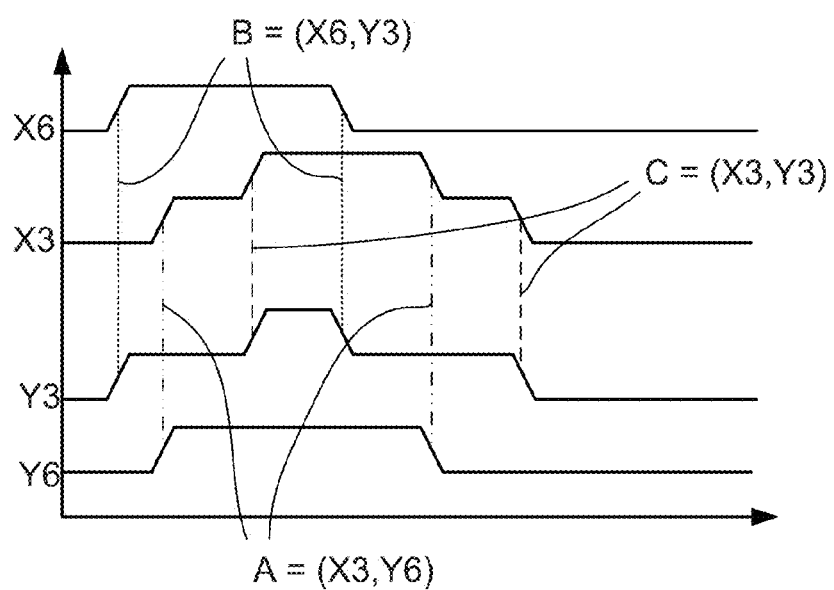
FIG. 5B schematically illustrates time plots of signals received for the touches indicated in FIG. 5A.

In FIG. 5A, an example of a capacitive or SAW system is shown in which touches A and B are applied, and then touch C is applied at one of the phantom touch locations created by the application of touches A and B. Thus, touch C shares an x-coordinate with touch A and a y-coordinate with touch B. In this case, as shown in FIG. 5B, the sequence of rise times on electrodes X3, X6, Y3, and Y6 may be correlated to discriminate touch B=(X6,Y3) and touch A=(X3,Y6). It can further be observed that signals centered at X3 and Y3 have differences in peak strength and/or width that may be discriminated as multiple touches, thereby resolving touch C=(X3,Y3) rather than the phantom location (X6,Y6).

Figure 6:
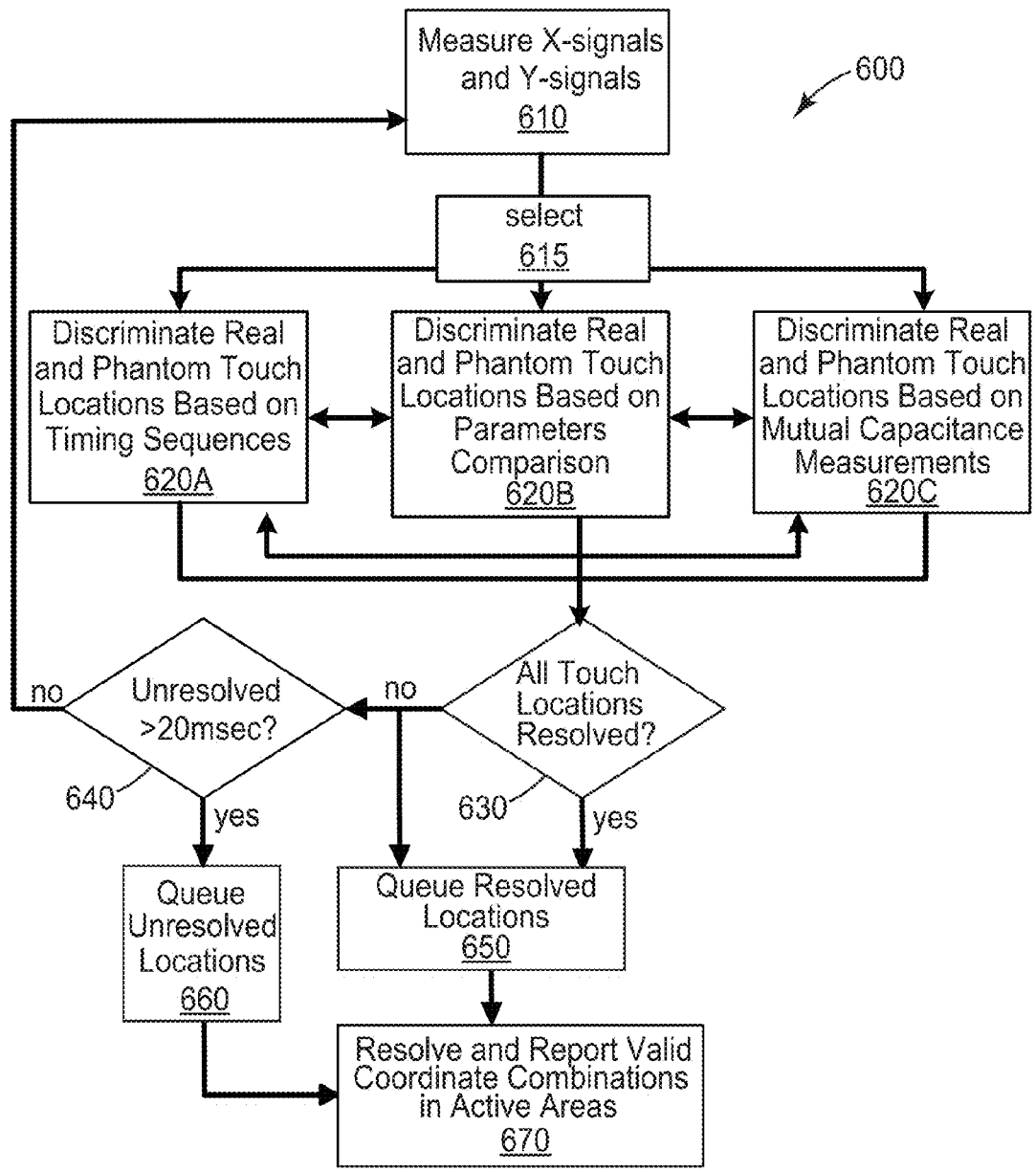
FIG. 6 illustrates steps used in assessing multiple touch inputs in accordance with certain embodiments of the present invention.

FIG. 6 shows a diagram of process 600 that may be used to assess multiple touches on a matrix capacitive sensor, and that includes steps to assess multiple touches applicable for IR and SAW sensors. In step 610, x-signals and y-signals are measured. The measured x- and y-signals are used to generate valid x- and y-coordinates. Real touch positions are then discriminated from phantom touch positions based on selecting 615 among various candidate discrimination methods 620A-620C. For example, signal timing sequences can be used to discriminate real and phantom touches per step 620A. Other signal parameters may be used to discriminate real and phantom touches per step 620B, such parameters including signal magnitude parameters, signal rate of change parameters, coincidence of apparent touch locations with allowed or disallowed regions, (for example, as illustrated in connection with FIGS. 8A and 8B), and so forth. In the case of a matrix capacitive sensor, mutual capacitance measurements may be used to discriminate real touches from phantom touches per step 620C. While in some cases all valid touch locations may be discriminated using a single discrimination technique such as indicated in 620A-620C, multiple techniques may be selected and used sequentially or concurrently, and applied singly or recursively, for example to discriminate touches difficult to discriminate using another technique, to validate touch discriminations made using other techniques, and so forth. In certain embodiments, the use of multiple discrimination techniques may be responsive to anticipating more complex discrimination operations, for example when detecting and discriminating 3 or more touches.

The measured touch signals may be re-measured and re-tested throughout process 600 to search for signal changes, for example at set intervals and/or for a certain time period (for example, predetermined or until all current touches are gone). Changes in the signals include changes due to movement of one or more of the touches across the touch sensor, lift-off of an exiting touch, touch-down of a new touch, and so forth. Signal changes may be used to help discriminate touch locations that have not yet been validated.

As each touch location is validated, the resolved touch locations are queued 650, and a determination is made whether any unresolved touch locations remain 630. If the unresolved touches have been unresolved for less than a certain time period 640 (for example, less than 20 to 40 msec), the measurement and discrimination steps are repeated so that additional information may be obtained. If unresolved touches remain unresolved after the time period 640, then the unresolved locations may be queued 660 and potentially resolved when valid touch locations are reported 670, for example by analyzing likely touch locations based on the resolved touch locations, allowed touch areas, allowed touch combinations, and so forth, which may be determined in conjunction with a particular application (for example, as illustrated in connection with FIGS. 8A and 8B). Active areas, active icons, and valid key combinations may be resolved by an application-aware process that has information about what touch combinations are valid. This application-aware process may be separate from other touch measurement processes, and thus unresolved touch position information may be reported to the application-aware process.

FIG. 7 shows an example signal strength histogram for a series of x-sensor elements (such as an x-electrode), the height of each bar being proportional to the signal strength perceived at each sensor element. In this case, at least two touches are present, one touch defined by signal envelope 70 having an x-coordinate near sensor element X2, and the other touch defined by signal envelop 71 having an x-coordinate near sensor element X4. The touches also capacitively couple to neighboring bars so that the touch near electrode X2 has contributions measurable on sensor elements X1 and X3, and the touch near sensor element X4 has contributions measurable on sensor elements X3 and X5. As such, touch 70 contributes signal 61 to sensor element X1, signal 62 to sensor element X2, and signal 63 to sensor element X3. Touch 71 contributes signal 64 to sensor element X3, signal 65 to sensor element X4, and signal 66 to sensor element X5.

Signals on neighboring sensor element are generally used to interpolate and refine touch positions. When two touches are being simultaneous applied as shown in FIG. 7 with both contributing to the same neighboring sensor element, interpolation may benefit from resolving the contributions from each touch to the overlapping neighboring sensor element. Such individual touch contributions on electrode X3 may be resolved as long as the touch-down and lift-off of both touches are not exactly simultaneous. If there is some time during which only one of the touches 70 and 71 exists, then the contribution of that touch to the signal measured on sensor element X3 may be determined, and may further be subtracted from the total contribution of both touches on sensor element X3 to determine the contribution of the other touch by itself.

Figure 8A:
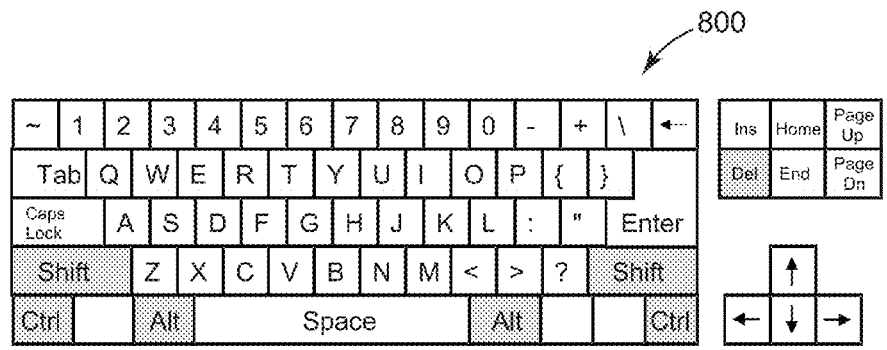
FIG. 8A illustrates an example virtual keyboard layout.
Figure 8B:
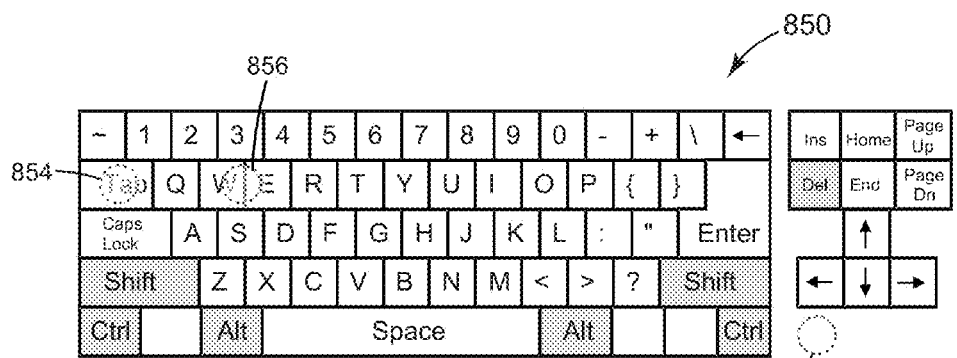
FIG. 8B illustrates an example virtual keyboard layout modified to allow resolution of anticipated key stroke combinations in accordance with certain embodiments of the present invention.

An example of valid combinations processing may be understood with respect to FIGS. 8A and 8B. FIG. 8A shows a standard PC keyboard layout 800. In normal keyboard operations, multiple keys are often used for data entry. This keyboard layout 800 may be a "virtual keyboard" that is displayed on a touch display. Various two-key keystroke combinations such as Shift, Ctrl, or Alt keys plus any letter are generally performed sequentially, and can thus can be validated using touch sequence processing as described above.

Three-key combination such as [Shift+Ctrl+an arrow key (←,↑,→, or ↓)] are also used, and may create phantom touches that may be difficult to resolve using signal timing sequences alone. For example, if Shift+Ctrl are touched, followed by ↑, a phantom touch may be created in the position of the ↓ key that is difficult to resolve by timing sequences. In certain applications both ↑ and ↓ may be valid keys in combination with Shift+Ctrl, (for example, in MS Word, for line-at-a-time highlighting). Such issues may be avoided by appropriately re-configuring the layout of the virtual keyboard, in this case moving the arrow keys up one row, as indicated by layout 850 in FIG. 8B. As such, the present invention contemplates repositioning of application-specific keys, icons, and buttons in positions that promote resolving of multiple-key combinations.

Referring again to keyboard layout 850 in FIG. 8B, the combination [Ctrl+Alt] generates no phantoms since these keys are in a single row, (assuming the touch sensor matrix is aligned with key rows). Touching Del while holding [Ctrl+Alt] generates a phantom touch point 852 in the area below key ←, and in the area of the Tab key 854 and the W and E keys 856 (assuming the left-side Ctrl and Alt are touched). The combinations of [Ctrl+Alt+Tab], [Ctrl+Alt+E], [Ctrl+

Alt+W], and [Ctrl+Alt+no key] can be identified as phantoms because [Ctrl+Alt] were measured before Del was touched, and the phantoms have one coordinate in common with the known touch coordinates. If this was not sufficient, the [Ctrl+Alt+Tab], [Ctrl+Alt+E], [Ctrl+Alt+W], and [Ctrl+Alt+no key] points can be eliminated if they form invalid combinations in conjunction with Ctrl+Alt given the particular application.

The foregoing description of the various embodiments of the invention has been presented for the purposes of illustration and description. It is not intended to be exhaustive or to limit the invention to the precise form disclosed. Many modifications and variations are possible in light of the above teaching. For example, the detection methodologies described herein may be used in connection with a wide variety of touch implements, including tethered implements and implements that house a battery or other power source. Moreover, the various processing steps can be implemented using a variety of devices and methods including general purpose processors implementing specialized software, digital signal processors, programmable logic arrays, discrete logic components and fully-programmable and semi-programmable circuits. It is intended that the scope of the invention be limited not by this detailed description, but rather by the claims appended hereto.

While the present invention has been described in the above description and attached Appendices A, B and C (which form part of this document and are incorporated in their entirety), and in the claims that follow, those skilled in the art will recognize that changes may be made thereto without departing from the spirit and scope of the present invention. Such changes may include, for example, the implementation of one or more approaches as described in Appendices A, B and C. These and other approaches as described in the contemplated claims below characterize aspects of the present invention.

Mutual Capacitance Multi-Touch Methods

Methods are presented that can discriminate a number of touches using data gathered from mutual capacitance measurements made on a matrix sensor. The methods calculate the fine touch positions and also sorts and tracks individual touches as they touchdown, draw and liftoff.

It is a property of a mutual capacitance matrix sensor that individual touch signals from either hand of one operator or multiple operators do not interfere with other touch signals, making multi-touch possible. Matrix sensors are XY arrays of straight electrode "bars" or connected pads, sometimes of a diamond shape. Mutual capacitance of each pad or intersection (node) of the bar arrays are the measurement parameters.

After scanning the matrix, the two main tasks of a controller are to sort and track individual touches as they touchdown, draw and liftoff, and to calculate a fine position using the capacitance measurements of the pads/bars which are arrayed in a coarse pitch.

Ratio methods have been used to calculate fine position for single touch matrix sensors. Once a coarse position has been established by finding the pad/bar with the strongest signal, fine position is then interpolated using the signals of 1 or 2 adjacent bars using a ratiometric formula.

In other methods, a general position for a touch in a multi-touch scenario has been calculated by first determining the shape of a region of nodes associated with an individual touch point using certain watershed algorithms and then calculating a centroid using a weighted average of the nodes in the group.

The algorithms set forth herein recursively find the center nodes of the multiple touches, and then interpolation algorithms may be applied.

The working prototype used a Silicon Labs (Austin, Tex.) C8051F327 microprocessor controlling an Analog Devices (Norwood, Mass.) AD7142 capacitance to digital converter. The AD7142 excitation drive was muxed, under C8051F327 control, to one axis of a small, diamond pattern matrix touch screen. The AD7142 internally multiplexed the sense lines to the other axis. Internal AD7142 environmental compensation was not and could not be used, instead being done by the C8051F327 firmware.

Signal strength generally falls off quickly for nodes further away from the point of touch. A touch screen type can be characterized as to the extent of this falloff for a typical touch. It is possible to define a Touch Width parameter which will define the radius of nodes around the center of a typical strong touch, beyond which the signal level will fall below a predetermined touch threshold. In other words, the Touch Width parameter is the radius of a circle (approximate circle) enclosing all nodes with signals above a defined threshold, resulting from a typical strong touch to the surface of a given sensor.

The algorithm scans the electrode array and finds the node with the strongest signal above a touch threshold. If this node and the nodes in the area adjacent to the node (based on the Touch Width parameter described above) have not been previously reserved, then this node is reserved along with the aforementioned nodes adjacent to it. Alternatively, nodes adjacent to, and increasingly distant from, the center node can be scanned and reserved until they are found to be below the touch threshold, but this may increase processing time.

For up to the number of supported touches, the present algorithm then recursively scans all unreserved nodes in the array in this manner, until none is found.

Note that in a mutual capacitance matrix touch screen, a touch actually lowers the ambient value, but the convention is to refer to a stronger touch signal as a "higher" value. Note also that in the algorithms below, Slew Check rejects spurious, or noise influenced, touch measurements. It also serves as a way to detect simultaneous (less than one scan interval apart) touchdown and liftoff events.

Algorithm 1, in Pseudo-Code:

```
Scan all nodes in a mutual capacitance matrix touch screen.
Save node values to a 2 dimension matrix (Drive x Sense).
Subtract stray and, optionally, palm
Examine Matrix:
Mark all nodes as unreserved.
Initialize a temporary list of new touches as all invalid.
loop through as many finger touches as supported
    loop through all drive lines
        loop through all sense lines
            if this node and predefined adjacent nodes has not been reserved,
            check if this node is the highest scanned in this loop, and, if it is,
            save the node's height and index
```

```
                next sense line
            next drive line
            check height of highest unreserved node found.
            if highest node is above touch threshold, add it to the list of valid new touches and
            reserve this node and the predefined adjacent nodes around it.
            else done Examine Matrix early
next finger
Sort Touches:
    We now have a temporary list of qualified new touches to be correlated with a
    working list of "old" touches.
Mark all old touches as unreserved.
Mark all old touch status as below threshold (pending update in the following loop)
Mark all new touches as not done.
while not done with new touches
    loop through all new touches (not already marked as done) in list
        loop through all valid, unreserved, old finger touches
            if this new touch is closer to this old touch than other old touches
            scanned in this loop, then save
            old and new touch indices and the distance separating them.
        next old touch
        if no valid, unreserved old touches were found in the previous loop, fill the
        first empty index in the working list of old touches with this new touch
        value, reserve the index and mark status as above threshold. Mark new
        touch index as done. End this new touch loop early.
    next new touch
    if a valid, unreserved, closest new/old touch pair was found, update the old touch value
    with the new and reserve the old touch's index in the working list and mark status as
    above threshold. Mark new touch index as done.
next while loop
We now have an updated working list of touches
For each index in working list, independently perform touch up/down logic, filtering,
scaling, optional slew check, and interpolation.
Send touch packet formatted by index order to host. Each index in packet contains a
continuous stream of data related to one finger touch from touchdown through liftoff.
```

End of Algorithm 1.

Figure 9A:
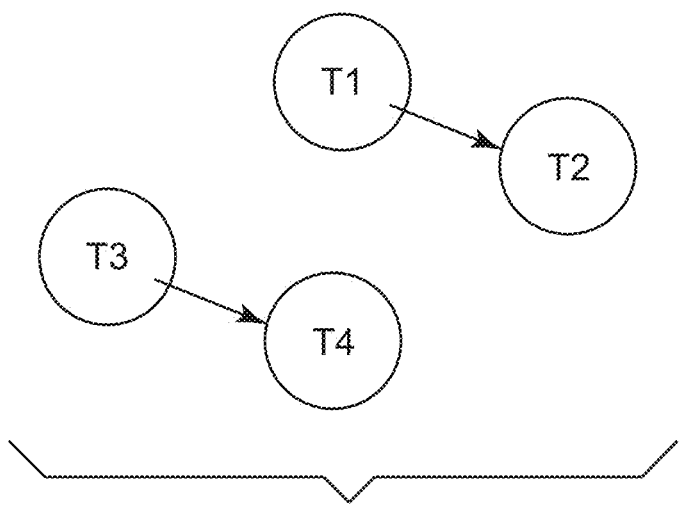
FIG. 9A illustrates an example of two distinct touchdown, drag, liftoff events.

Algorithm 1 works well when motion between scans is sufficiently slow when compared to scan speed so as to avoid ambiguous situations. Algorithm 1 iterates through all combinations of all new and old touches, and pairs them in order of closest distance. FIG. 9 shows a two touchdown events as could be on a touch screen surface. A finger, for example, touches down at position T1, then moves and lifts off at position T2. Meanwhile, a similar event happens with respect to positions T3 and T4. If the scan takes place sufficiently fast relative to the speed of the finger movement, FIG. 9 shows a representation of the actual resolved touches and liftoffs.

Figure 9B:
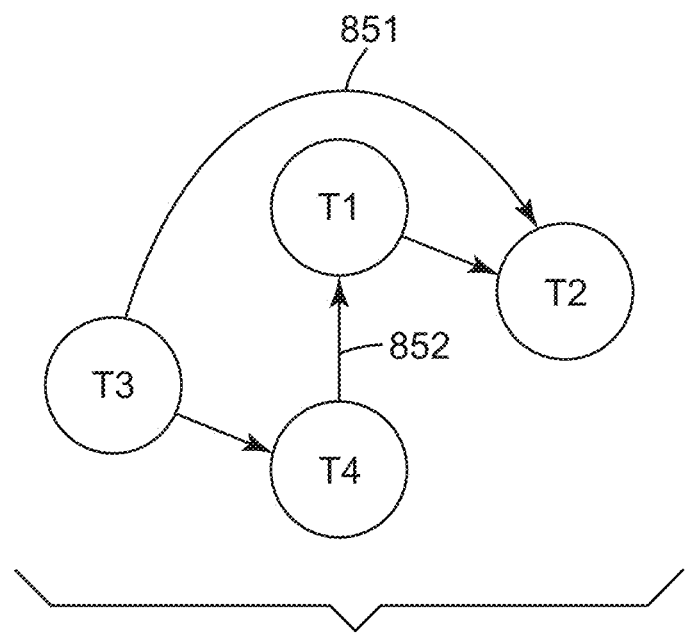
FIG. 9B illustrates how the two distinct touchdown events of FIG. 9A may be incorrectly interpreted.

However, ambiguous situations can occur with slow scanning and/or fast motion. FIG. 9B shows how the touch/drag sequences from FIG. 9A may in fact be interpreted—either including path 851 or path 852.

Algorithm 2 set forth below may be used to correct for fast motion artifacts such as those shown with respect to FIG. 9B. Algorithm 2 also iterates through all combinations of all new and old touches, and pairs them by closest distance, but does this in order of new touches rather than in order of closest distance. It then iterates though all permutations of new touch order. The number of permutations is N factorial, where N is the number of new touches. For each permutation, there results a pair with a minimum distance, and a pair with a maximum distance. Finally, it accepts the results of the permutation that produces the smallest maximum pair distance. Algorithm 2 in Pseudo-Code:

```
loop for all permutations of new touches
    Mark all old touches as unreserved.
    Mark all old touch status as below threshold (pending update in the following loop)
    Mark all new touches as not done.
    loop through all new touches in list, in the permutation order
        loop through all valid, unreserved, old finger touches.
            If this new touch is closer to this old touch than other old touches scanned
            in this loop, then save old and new touch indices and the distance
            separating them. If the distance of this pair is larger than previous pairs in
            the loop, save the distance as the largest distance.
        next old touch
        if no valid, unreserved old touches were found in the previous loop, fill the first
        empty index in the working list of old touches with this new touch value, reserve
        the index and mark status as above threshold. M ark new touch index as done. End
        this new touch loop early.
        if a valid, unreserved, closest new/old touch pair was found, update the old touch
        value with the new and reserve the old touch's index in the working list and mark
        status as above threshold. Mark new touch index as done.
    next new touch
        If the largest pair distance found in this permutation is larger than previous
        permutations in the loop, save the distance as the largest distance.
    next permutation
```

-continued

Re-run the above algorithm using only the best permutation and update the final list of touches. (Or copy saved temporary best list to the final list)

End of Algorithm 2.

Projected Capacitive Touch Discrimination Methods

This section describes an example algorithm that can discriminate a single touch or the rectangle (bounding box) defined by two touches using data gathered from a projected capacitive matrix sensor. The algorithm calculates the fine touch positions and also sorts and tracks touches as they touchdown, draw and liftoff.

A projected capacitive matrix sensor is constructed as XY arrays of straight bars or connected pads, usually of a diamond shape, arrayed in a coarse pitch.

This type of sensor may be quickly and economically scanned by measuring the capacitance of an entire row or column at a time. However when scanned in this manner, if two fingers are touching simultaneously, this creates two phantom touches. These appear at the opposite pair of diagonal corners of a rectangle defined by the actual touches.

Ratio methods have been used to calculate fine position for single touch matrix sensors and sliders. (A matrix screen can be thought of as two sliders, one on each axis.) Once a coarse position has been established by finding the bar with the strongest signal, fine position is then interpolated using the signals of 1 or 2 adjacent bars using a ratiometric formula.

One can also determine a fine position of slider or single matrix axis by calculating a centroid using a weighted average of the bars in the axis.

The algorithm of this invention finds the center bars of the one or two touches on each axis, and then uses interpolation.

The present algorithm can be used for certain two-finger gestures, including pinch and object rotation, but not limited to them, desired by customers in hand-held electronics markets. The present algorithm also allows the host software to implement touch gestures in a hardware independent manner.

The working prototype used a Silicon Labs (Austin, Tex.) C8051F327 microprocessor controlling a pair of Analog Devices (Norwood, Mass.) AD7147 capacitance to digital converters, one on each axis, each operating alternately while the other is disabled. Internal AD7147 environmental compensation was not and could not be used, instead being done by the C8051F327 firmware.

Signal strength falls off quickly for bars further away from the point of touch. A touch screen type can be characterized as to the extent of this falloff for a typical touch. It is possible to define a Touch Width parameter which will specify the distance from the center of a strong touch, beyond which the signal level will fall below the touch threshold.

The algorithm scans each axis and looks for the bars with the two strongest signals over a touch threshold. If there is only one bar over the threshold, or if these two bars are not sufficiently separated (based on the Touch Width parameter described above), the algorithm enters a single-touch state. In this state, the algorithm calculates the fine coordinate of each axis using an interpolation algorithm. The coordinate is then reported in a format indicating that only one finger is touching. Otherwise, if these two bars are sufficiently separated, the algorithm enters a two-touch state.

In the two-touch state, the algorithm calculates the fine coordinates of the two touch positions on each axis using this same interpolation algorithm. The exact touch positions are ambiguous in that there are four possible solutions for two touches. For example, given a real touches on coordinate (X3, Y9) and (X6, Y4), other touches (phantom touches) would be reported on (X6, Y9) and (X3, Y4). The two pairs of fine coordinates are then arranged so as to report the coordinates of the rectangle's upper left and lower right corners. It does not matter which two of the four corners are real and which are the phantom. The coordinates are reported in a format indicating that two fingers are touching.

Described Algorithm, in Pseudo-Code:

Scan all row and column bars in a projected capacitive matrix touch screen, save measurements to individual axis arrays.
Subtract stray and, optionally, palm
loop through X axis array
    check if bar is the highest scanned in this loop, and, if it is above touch threshold,
    save the bar's height and index
next bar
If a qualified bar is found,
    loop through X axis array
        excluding 1$^{st}$ bar or predefined adjacent bars around it, if bar is the highest
        scanned in this loop, and, if it is above touch threshold, save the bar's
        height and index
    next bar
If a qualified X axis bar is found,
    loop through Y axis array
        check if bar is the highest scanned in this loop, and, if it is above touch
        threshold, save the bar's height and index
    next bar
If a qualified bar is found,
    loop through Y axis array
        excluding 1$^{st}$ bar or predefined adjacent bars around it, if bar is the highest
        scanned in this loop, and, if it is above touch threshold, save the bar's
        height and index
    next bar
If both axis scans returned two qualified touch bars, arrange coordinates of bars into upper
left and lower right pairs, enter two-touch state.
Else, if only one qualified coordinate pair is found, enter single-touch state.

-continued

If in two-touch state, for each corner independently perform touch up/down logic, filtering, scaling, optional slew check, and interpolation is performed. Output touch packet formatted by Upper Left, Lower Right, index order.
Else, if in single-touch state, perform touch up/down logic, filtering, scaling, optional slew check, and same interpolation and output touch packet formatted so as to indicate it is a single touch.

End of Algorithm.

Interpolation Methods

A scaling parameter can be used to optimize interpolation of bars/pads over a wide variety of matrix and slider sensors. Also included is a method which can be used to determine the best value of this parameter Sliders and matrix sensors are made from several pads or bars arranged in one or two axes. The resolution is not limited to just the number of pads or bars. Resolution can be improved by interpolating between the pads/bars. The common method is to scale the ratio of the signal strength of two adjacent bars to the width of a pad/bar (that is, pitch).

The signal strength of the bars, and thus the ratio, mostly depends on the width of the pad/bar and the size and shape of the flat patch of finger and the thickness of the dielectric material, typically PET or glass.

In this example we use the convention to interpolate left to right from the dominant bar to the adjacent bar on its right. In this convention, the interpolation is based starting ½ bar width to the left of the dominant bar, where the signal strength is the same as the adjacent bar to its left, and extends to ½ bar width to its right. Bar1 is the bar with the strongest signal, and Bar2 is adjacent to the right. The interpolation offset is (BarWidth*(Bar2/(Bar1+Bar2)))

Figure 10A:
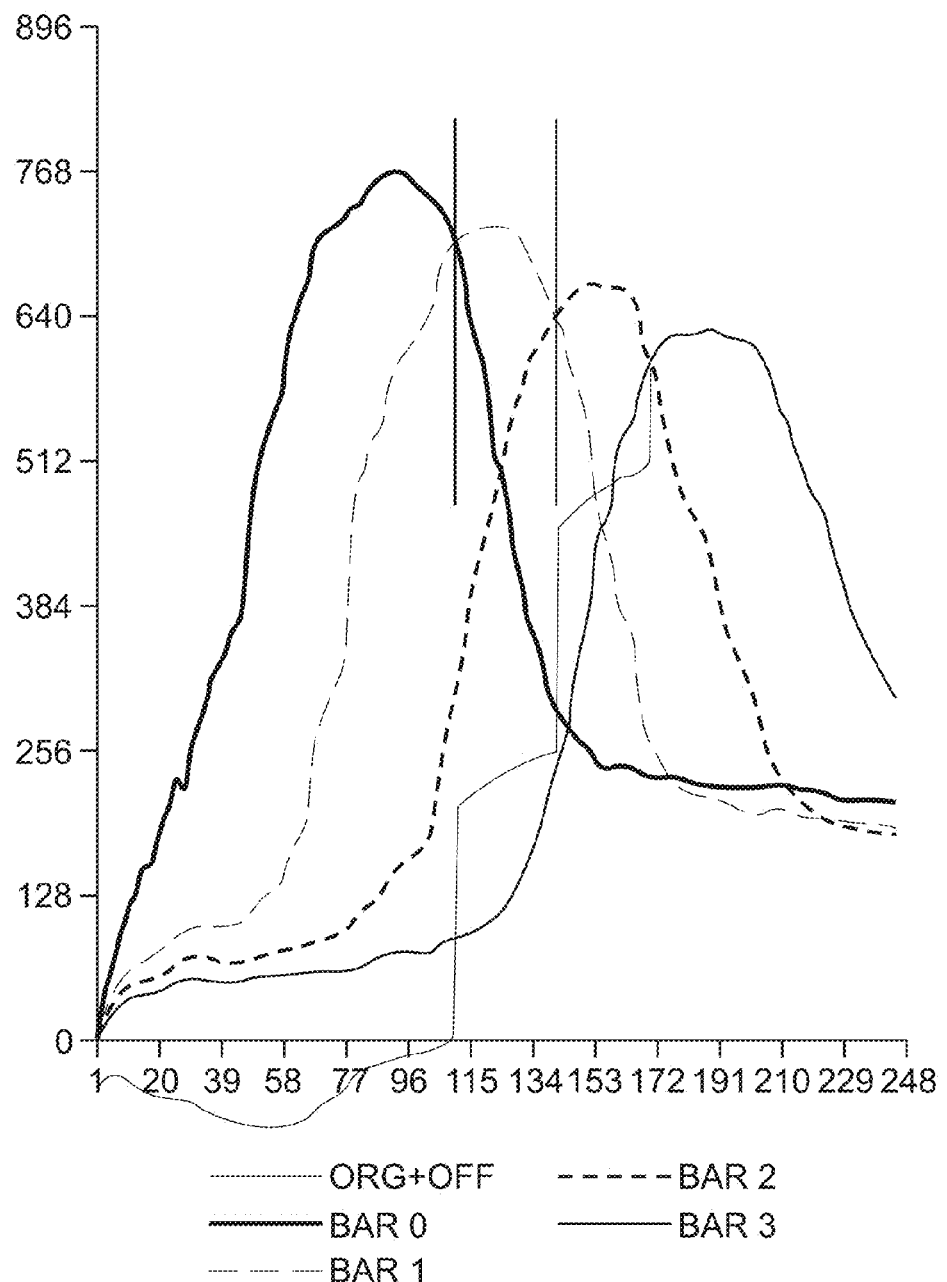
FIG. 10A is a graph illustrating a touch-down event with basic ration interpretation.

This offset is then added to the base located at the center of Bar1. For most sensors, this produces a non-linear result, as shown in FIG. 10A. ("ORG+OFF" plot in FIGS. 10A, 10B, and 10C refer to the raw bar signals (input) as well as the interpolated position calculation (output). The interpolated position is an offset from the center of a bar (origin).

The improved interpolation results in more accurate touch coordinates. The parameterization allows a single firmware to support a variety of matrix and slider sensors. The parameter can be stored in EEPROM along with other information about the sensors such as the number of pads/bars. A single parameter can be applied to all bars, but can also be optimized individually in cases where bars are of a different size or pitch, most obviously the X and Y planes of a bar matrix sensor.

Other interpolation conventions have used half range interpolations using left and right bars from center. Exceptions are made for leftmost and/or rightmost bars, for instance, the 3M TG3 touch controller and Touchware/MT7 software used pushing techniques to allow fat fingers reach the edges of the active touch area, with the tradeoff of accuracy in the border area.

The improved interpolation method is to apply a scaling parameter which produces better results than just using the bar width. The method to determine the best value for the scaling parameter is to perform a calibration procedure to characterize the sensor type. To do this, record the signal strength of the bars/pads while sweeping a finger or probe across them at a steady rate. When graphed as shown in FIG. 10A, the signal at four representative bars rises to a peak and then falls in order. The actual values can be copied into a spreadsheet which models the same interpolation convention, which is:

Interpolation Offset=((ScalingFactor*(Bar2/(Bar1+Bar2))))−(ScalingFactor/2)+(BarWidth/2).

This offset is then added to the center of [Bar1, (N*BarWidth)], where N is the zero-based order of Bar1.

Figure 10B:
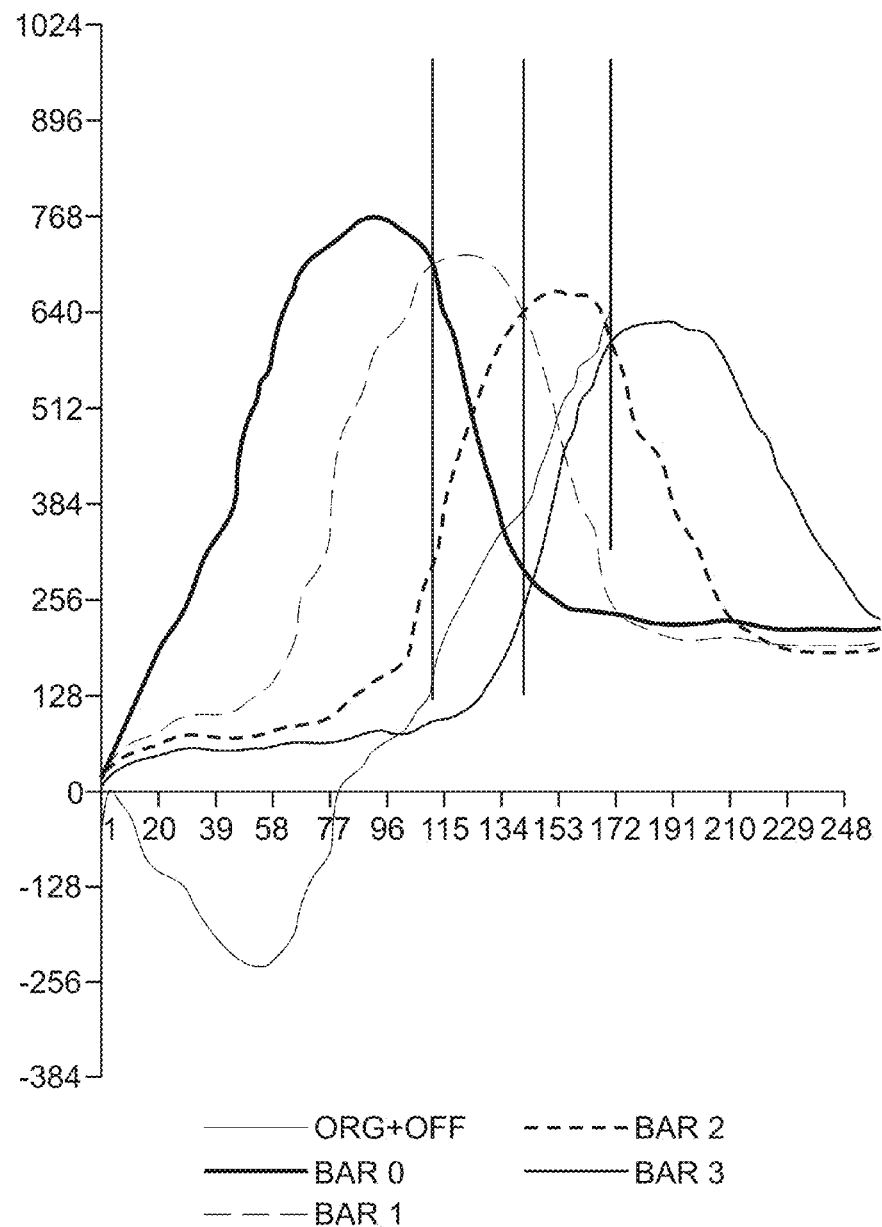
FIG. 10B is a graph illustrating a touch-down event.
Figure 10C:
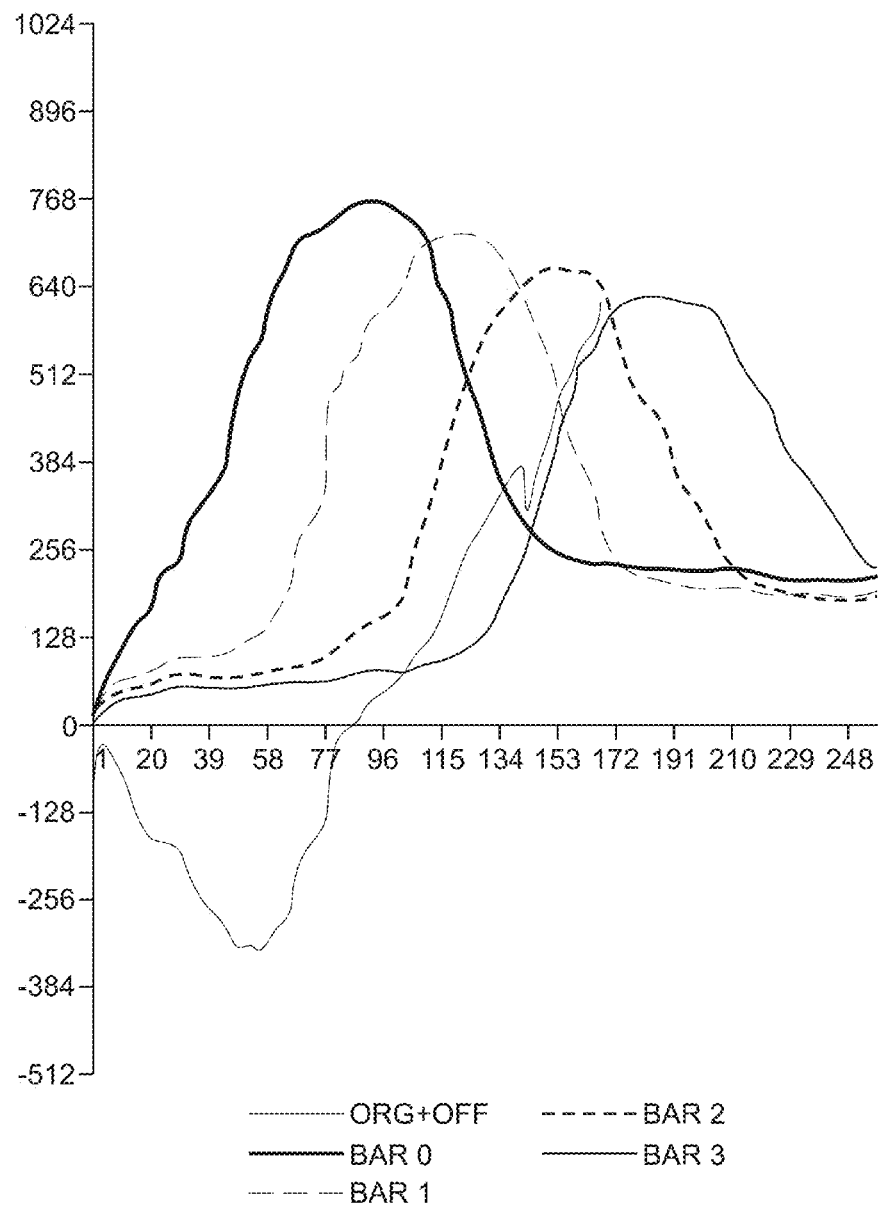
FIG. 10C is a graph illustrating a touch-down event.

Once the data is in the spreadsheet, it then easy to vary the scaling factor manually (working upward from BarWidth) to get the best result, which is shown in FIG. 10B.

Alternatively, a software algorithm could choose the scale to best match the endpoints of the mismatched adjacent interpolations shown in FIG. 10A, and then iteratively look for best fit of the remainder of the measured points.

However it is calculated, overcorrecting with a too-large scaling factor as shown in FIG. 10B should be avoided.

Alternatively, the values from the above formula may be pre-calculated and placed into a read-only table for use. The table may, for example, consist of a number of sets of values, with each set corresponding to one scaling parameter value. The set that best fits the sensor would be used. Using a table to model a sinusoidal (or arbitrary shaped) offset may be more computationally efficient than a pure formulaic approach, which in some embodiments may result in an improvement in accuracy.

This method and application was prototyped on a 3M Touch Systems matrix sensor demo board using a Silicon Labs (Austin, Tex.) C8051F327 microprocessor running a Analog Devices (Norwood, Mass.) AD7147 capacitance to digital converter, and several matrix sensors.

What is claimed is:

1. For use in a matrix capacitive touch screen system that includes a sensor having a plurality of x-electrodes for providing x-signals based on capacitance-to-ground measurements and indicative of x-coordinates of touch inputs, and a plurality of y-electrodes for providing y-signals based on capacitance-to-ground measurements and indicative of y-coordinates of touch inputs, a method for assessing touch locations of two or more temporally overlapping touch inputs, the method comprising:

responsive to capacitance-to-ground x-signals, determining valid x-coordinates of the two or more temporally overlapping touch inputs;

responsive to capacitance-to-ground y-signals, determining valid y-coordinates of the two or more temporally overlapping touch inputs;

assessing the capacitance-to-ground x-signals and the capacitance-to-ground y-signals as a function of a timing sequence associated with at least one of the touch inputs;

in response to the steps of determining and of assessing, forming valid x-y pairs, the valid x-y pairs being indicative of the touch locations and the remaining touch inputs being unresolved;

in response to forming the valid x-y pairs, forming additional valid x-y pairs for one or more of the remaining unresolved touch inputs, as additional valid x-y pairs are formed, they are determined as pertaining to a valid touch which can then be discriminated as corresponding to a real touch, as opposed to a phantom touch; and discriminating each valid x-y pair as corresponding to a real touch as opposed to a phantom touch, even as the touch is moved across the touch surface.

2. The method of claim 1, wherein forming valid x-y pairs includes comparing timing sequences of capacitance-to-ground x-signals to timing sequences of capacitance-to-ground y-signals.

3. The method of claim 1, wherein forming valid x-y pairs includes comparing magnitudes of capacitance-to-ground x-signals to magnitudes of capacitance-to-ground y-signals.

4. The method of claim 1, wherein forming valid x-y pairs includes comparing rates of change of at least one parameter of capacitance-to-ground x-signals to rates of change of the at least one parameter of capacitance-to-ground y-signals.

5. The method of claim 4, wherein the at least one parameter includes signal strength.

6. The method of claim 4, wherein the at least one parameter includes signal width.

7. The method of claim 1, wherein forming valid x-y pairs includes measuring mutual capacitance signals between x-electrodes located proximate to the determined x-coordinates and y-electrodes located proximate to the determined y-coordinates.

8. The method of claim 1, further comprising
sensing capacitance-to-ground x-signals and capacitance-to-ground y-signals associated with pre-touch hovering of at least one of the touch inputs after forming and storing valid x-y pairs as corresponding to real touches, as opposed to phantom touches.

9. The method of claim 8, wherein forming valid x-y pairs includes using the sensed pre-touch hovering signals.

10. The method of claim 1, wherein forming valid x-y pairs includes comparing possible coordinate pairs to allowed touch areas and further storing the formed valid x-y pairs as corresponding to real touches, as opposed to phantom touches.

11. A matrix capacitive touch screen system comprising:
a sensor including a plurality of x-electrodes for providing x-signals based on capacitance-to-ground measurements and indicative of x-coordinates of touch input locations, and a plurality of y-electrodes for providing y-signals based on capacitance-to-ground measurements and indicative of y-coordinates of touch input locations;
a controller including logic circuitry and coupled to the x-electrodes to receive the x-signals and coupled to the y-electrodes to receive the y-signals, the controller configured to
determine one or more x-coordinates from the x-signals and one or more y-coordinates from the y-signals,
assess the capacitance-to-ground x-signals and the capacitance-to-ground y-signals as a function of a timing sequence associated with at least one of the touch inputs,
form valid x-y pairs from the determined x-coordinates and determined y-coordinates, the valid x-y pairs being indicative of locations of the two or more temporally overlapping touch inputs with the remaining touch inputs being unresolved, and being formed while permitting for a touch moving across the touch surface to form another valid x-y pair, and
delay forming the another valid x-y pair until sufficient additional x-signals or y-signals are received to allow one or more of the remaining unresolved touch inputs to be validated, wherein as the another valid x-y pair is formed, the another valid x-y pair is determined as pertaining to a valid touch which can then can be discriminated as corresponding to a real touch, as opposed to a phantom touch, even as the touch is moved across the touch surface.

12. The touch screen system of claim 11, further comprising a processor to receive the valid x-y pairs from the controller and to execute operations of one or more applications in response thereto.

13. The touch screen system of claim 12, wherein the controller is further configured to receive information from the processor related to application-specific allowed touch areas, and to use the received information to form the valid x-y pairs.

14. The touch screen system of claim 11 implemented in a multiplayer game.

15. The touch screen system of claim 11 implemented in a mobile device.

16. For use in a matrix touch screen system that includes a sensor providing x-signals indicative of x-coordinates of touch inputs and y-signals indicative of y-coordinates of touch inputs, a method for assessing touch locations of three or more temporally overlapping touch inputs comprising:
determining valid x-coordinates of the three or more temporally overlapping touch inputs from received x-signals;
determining valid y-coordinates of the three or more temporally overlapping touch inputs from received y-signals;
forming a first valid x-y pair from the determined x-coordinates and determined y-coordinates, the first valid x-y pair being indicative of touch location of a first one of the three or more temporally overlapping touch inputs, the remaining touch inputs being unresolved; and
responsive to the first valid x-y pair, forming additional valid x-y pairs for one or more of the remaining unresolved touch inputs, wherein each valid x-y pair is discriminated as corresponding to a real touch as opposed to a phantom touch and as additional valid x-y pairs are formed, they are determined as pertaining to a valid touch which can then be discriminated as corresponding to a real touch, as opposed to a phantom touch, even as a touch is moved across the touch surface.

17. For use in a matrix touch screen system that includes a sensor providing x-signals indicative of x-coordinates of touch inputs and y-signals indicative of y-coordinates of touch inputs, a method for assessing touch locations of three or more temporally overlapping touch inputs comprising:
determining valid x-coordinates of the three or more temporally overlapping touch inputs from received x-signals;
determining valid y-coordinates of the three or more temporally overlapping touch inputs from received y-signals;
forming a first valid x-y pair from the determined x-coordinates and determined y-coordinates, the first valid x-y pair being indicative of touch location of a first one of the three or more temporally overlapping touch inputs, the remaining touch inputs being unresolved;
responsive to the first valid x-y pair, forming additional valid x-y pairs for one or more of the remaining unresolved touch inputs, wherein each valid x-y pair is discriminated as corresponding to a real touch as opposed to a phantom touch; and
delaying forming additional valid x-y pairs until sufficient additional x-signals or y-signals are received to allow one or more of the remaining unresolved touch inputs to be validated, wherein as additional valid x-y pairs are formed, they are determined as pertaining to a valid touch which can then be discriminated as corresponding to a real touch, as opposed to a phantom touch, even as a touch is moved across the touch surface.

18. The method of claim 16, further comprising reporting valid x-y pairs as touch locations to a processor executing operations of an application based on the touch locations.

19. The method of claim 18, further comprising reporting x- and y-coordinates of the remaining unresolved touch inputs to the processor and, responsive thereto, receiving information from the processor related to application-specific allowed touch areas.

20. The method of claim 16, wherein the sensor is a matrix capacitive sensor.

21. The method of claim 16, wherein the sensor is an IR sensor.

22. The method of claim 16, wherein the sensor is a SAW sensor.

23. For use in a matrix capacitive touch screen system that includes a sensor and a display, the sensor having a plurality of x-electrodes for providing x-signals based on capacitance-to-ground measurements and indicative of x-coordinates of touch inputs, and a plurality of y-electrodes for providing y-signals based on capacitance-to-ground measurements and indicative of y-coordinates of touch inputs, a method comprising:
  detecting two temporally overlapping touch inputs to the sensor;
  responsive to an assessment of capacitance-to-ground x-signals, determining valid x-coordinates of the two temporally overlapping touch inputs, wherein each valid x-y coordinate is discriminated as corresponding to a real touch as opposed to a phantom touch;
  responsive to an assessment of capacitance-to-ground y-signals, determining valid y-coordinates of the two temporally overlapping touch inputs;
  defining a bounding box having vertices at intersections of the determined x- and y-coordinates, the bounding box associated with an area indicated on the display; and
  adjusting the area indicated on the display in response to detecting relative motion of the two overlapping touch inputs.

24. A matrix capacitive touch screen system comprising:
  a display;
  a sensor including a plurality of x-electrodes for providing x-signals based on capacitance-to-ground measurements and indicative of x-coordinates of touch input locations, and a plurality of y-electrodes for providing y-signals based on capacitance-to-ground measurements and indicative of y-coordinates of touch input locations;
  a controller including logic circuitry and coupled to the x-electrodes to receive the x-signals and coupled to the y-electrodes to receive the y-signals, the controller configured to assess the capacitance-to-ground measurements relative to each of the x-signals and the y-signals and to determine valid x-coordinates of touch inputs from received x-signals and to determine valid y-coordinates of touch inputs from received y-signals, wherein in response to detecting two temporally overlapping touch inputs, the controller defines a bounding box having vertices at intersections of the determined x- and y-coordinates, adjusts the bounding box based on detecting subsequent relative motion between the two touch inputs, and transmits information related to the bounding box for indication on the display.

25. For use in a matrix touch screen having a plurality of nodes at the intersections of x- and y-sensor bars, each node being driven by electronics such that it yields a signal strength, a method for assessing touch locations of two or more temporally overlapping touch inputs comprising:
  for nodes having signal strength above a defined touch-event threshold:
  (1) associating the node having the highest signal strength with a first touch;
  (2) associating nodes adjacent the node with the highest signal strength with the first touch, and associating unassociated nodes adjacent to nodes associated with the first touch with a reserve area and, thereafter, using the reserve area to search for further nodes that are associated with the first touch;
  (3) among nodes not associated with the first touch, associating the node having the highest signal strength with a second touch; and,
  (4) associating nodes adjacent to the node associated with the second touch with the second touch.

26. The method of claim 25, wherein adjacent at least comprises nodes one node away from a given node.

27. The method of claim 26, further comprising:
  wherein step (3) additionally excludes nodes included in the reserve area from consideration for the second touch.

28. For use in a matrix capacitive touch screen system that includes a sensor having a plurality of x-electrodes for providing x-signals based on capacitance-to-ground measurements and indicative of x-coordinates of touch inputs, and a plurality of y-electrodes for providing y-signals based on capacitance-to-ground measurements and indicative of y-coordinates of touch inputs, a method for assessing touch locations of two or more temporally overlapping touch inputs, the method comprising:
  responsive to an assessment of capacitance-to-ground x-signals, determining valid x-coordinates of the two or more temporally overlapping touch inputs;
  responsive to an assessment of capacitance-to-ground y-signals, determining valid y-coordinates of the two or more temporally overlapping touch inputs;
  sensing and assessing capacitance-to-ground x-signals and capacitance-to-ground y-signals associated with pre-touch hovering of at least one of the touch inputs; and
  in response to the steps of determining and sensing and assessing, forming valid x-y pairs, the valid x-y pairs being indicative of the touch locations and the remaining touch inputs being unresolved;
  in response to forming the valid x-y pairs, forming additional valid x-y pairs for one or more of the remaining unresolved touch inputs, as additional valid x-y pairs are formed, they are determined as pertaining to a valid touch which can then be discriminated as corresponding to a real touch, as opposed to a phantom touch; and
  discriminating each valid x-y pair as corresponding to a real touch as opposed to a phantom touch, even as the touch is moved across the touch surface.

29. The method of claim 28, wherein forming valid x-y pairs includes using the sensed pre-touch hovering signals.

* * * * *